United States Patent
Chernov et al.

(10) Patent No.: US 10,370,260 B2
(45) Date of Patent: Aug. 6, 2019

(54) FILTERS FOR APPLIANCES

(71) Applicant: Haier US Appliance Solutions, Inc., Wilmington, DE (US)

(72) Inventors: Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 233 days.

(21) Appl. No.: 15/205,022

(22) Filed: Jul. 8, 2016

(65) Prior Publication Data

US 2018/0008915 A1     Jan. 11, 2018

(51) Int. Cl.

| | |
|---|---|
| *B01D 1/28* | (2006.01) |
| *B01D 35/30* | (2006.01) |
| *C02F 1/00* | (2006.01) |
| *B01D 3/00* | (2006.01) |
| *B01D 35/027* | (2006.01) |
| *B01D 29/11* | (2006.01) |
| *B01D 29/90* | (2006.01) |
| *C02F 1/28* | (2006.01) |
| *C02F 1/50* | (2006.01) |

(52) U.S. Cl.
CPC .............. *C02F 1/003* (2013.01); *B01D 1/28* (2013.01); *B01D 3/007* (2013.01); *B01D 29/114* (2013.01); *B01D 29/902* (2013.01); *B01D 35/0273* (2013.01); *B01D 35/30* (2013.01); *B01D 2201/295* (2013.01); *C02F 1/283* (2013.01); *C02F 1/505* (2013.01); *C02F 2307/12* (2013.01)

(58) Field of Classification Search
None
See application file for complete search history.

(56) References Cited

U.S. PATENT DOCUMENTS

| | | | |
|---|---|---|---|
| 4,828,698 A * | 5/1989 | Jewell ............... | B01D 27/02 210/266 |
| 5,919,357 A | 7/1999 | Wilkins et al. | |
| 6,395,190 B1 | 5/2002 | Koslow et al. | |
| 6,426,001 B1 | 7/2002 | Fritze | |
| 6,485,641 B1 | 11/2002 | McLeod | |
| 6,524,411 B2 * | 2/2003 | Pulek ............... | B01D 29/111 156/293 |

(Continued)

FOREIGN PATENT DOCUMENTS

| | | |
|---|---|---|
| DE | 202008002581 U1 | 4/2008 |
| EP | 2533690 A1 | 8/2011 |
| WO | WO2005005013 A1 | 1/2005 |

*Primary Examiner* — Jonathan M Peo
(74) *Attorney, Agent, or Firm* — Dority & Manning, P.A.

(57) ABSTRACT

A filter for a non-plumbed appliance is provided. The filter includes a filter housing defining a filter chamber. A filter medium is positioned within the filter chamber, each end of the filter medium being enclosed by an endcap formed from a resilient material, such as molded silicone or a thermoplastic elastomer. The endcaps slide on the ends of the filter media with no need for adhesive and form a fluid seal with both the filter media and the filter housing once installed. One or more fluid bypass channels may be defined by the filter housing or in the endcaps to allow water to flow as desired within the filter chamber. The resulting filter requires fewer components and less assembly time while improving filtration performance and reliability.

20 Claims, 14 Drawing Sheets

(56) References Cited

U.S. PATENT DOCUMENTS

| | | | |
|---|---|---|---|
| 7,163,625 B1 | 1/2007 | Williamson et al. | |
| 7,419,591 B2 * | 9/2008 | Aberle | B01D 24/08 |
| | | | 210/109 |
| 8,151,694 B2 | 4/2012 | Jacobs et al. | |
| 8,177,969 B2 | 5/2012 | Wawrla | |
| 2004/0206682 A1 * | 10/2004 | Hamlin | B01D 19/0031 |
| | | | 210/321.6 |
| 2011/0089103 A1 * | 4/2011 | Bommi | B01D 36/001 |
| | | | 210/472 |
| 2014/0131264 A1 * | 5/2014 | Patera | B01D 36/02 |
| | | | 210/198.1 |
| 2014/0202195 A1 | 7/2014 | Hawkins et al. | |
| 2014/0238920 A1 * | 8/2014 | Ergican | B01D 35/30 |
| | | | 210/232 |

* cited by examiner

FILTERS FOR APPLIANCES

FIELD OF THE INVENTION

The present subject matter relates generally to filters used for contaminate removal in appliances, and in particular non-plumbed appliances such as stand-alone ice making appliances.

BACKGROUND OF THE INVENTION

Filters are used in various applications to filter contaminates from liquids before use. For example, a filter may be installed in a refrigerator appliance or ice maker to filter water before the water is output to a user or used to make ice. In many cases, such as in refrigerator appliance applications, the filter is installed onto a pressurized water supply line such that water flowing through the water supply line is flowed through the filter. However, in other applications, referred to herein as non-plumbed applications, the filter is submerged in a water tank filled with water and a pump is used to draw water from the water tank through the filter.

Filters for non-plumbed appliances typically include filter media having a hollow interior passage. The ends of the filter media are typically enclosed by plastic endcaps which direct the flow of water through the filter media and are used to mount the filter media within the filter housing. However, filters constructed with such plastic endcaps typically have complex designs and experience performance issues. For example, the filter housings require multiple hermetic welds and the endcaps must be attached to the filter media using an adhesive, such as a hot melt adhesive. Therefore, these filters require additional parts and more complicated assembly. In addition, such filters are prone to performance and reliability problems, such as an increased likelihood of leaks at the joints formed by welding or with adhesive.

Accordingly, an improved filter for a non-plumbed appliance would be useful. More specifically, a filter enabling improved filtration performance and increased reliability while reducing design complexity and simplifying the assembly process would be particularly beneficial.

BRIEF DESCRIPTION OF THE INVENTION

The present subject matter provides a filter for a non-plumbed appliance. The filter includes a filter housing defining a filter chamber. A filter medium is positioned within the filter chamber, each end of the filter medium being enclosed by an endcap formed from a resilient material, such as molded silicone or a thermoplastic elastomer. The endcaps slide on the ends of the filter media with no need for adhesive and form a fluid seal with both the filter media and the filter housing once installed. One or more fluid bypass channels may be defined by the filter housing or in the endcaps to allow water to flow as desired within the filter chamber. The resulting filter requires fewer components and less assembly time while improving filtration performance and reliability. Additional aspects and advantages of the invention will be set forth in part in the following description, or may be apparent from the description, or may be learned through practice of the invention.

In accordance with one embodiment, a non-plumbed appliance defining a vertical direction, a lateral direction, and a transverse direction is provide. The non-plumbed appliance includes a water tank defining a storage volume, a pump in fluid communication with the storage volume for actively flowing water from the water tank, and a filter disposed within the storage volume such that water is flowable from the storage volume through the filter to the pump. The filter includes a filter housing including a sidewall extending along a longitudinal axis between a first end wall and a second end wall, the filter housing defining a filter chamber. A filter inlet is positioned on the filter housing and a filter outlet is positioned proximate the second end wall of the filter housing. A filter medium is positioned within the filter chamber, the filter medium defining a first end, a second end separated from the first end along the longitudinal axis, and an interior passage, the filter medium being operable to remove contaminants from water flowing through the filter medium. A first end cap is positioned at the first end of filter medium and forms a fluid seal with the filter medium and the filter housing, and a second end cap is positioned at the second end of filter medium and forms a fluid seal with the filter medium and the filter housing.

In accordance with another embodiment, a filter for a non-plumbed appliance is provided. The filter includes a filter housing including a sidewall extending along a longitudinal axis between a first end wall and a second end wall, the filter housing defining a filter chamber. A filter inlet is positioned on the filter housing and a filter outlet is positioned proximate the second end wall of the filter housing. A filter medium is positioned within the filter chamber, the filter medium defining a first end, a second end separated from the first end along the longitudinal axis, and an interior passage, the filter medium being operable to remove contaminants from water flowing through the filter medium. A first end cap is positioned at the first end of filter medium and forms a fluid seal with the filter medium and the filter housing, and a second end cap is positioned at the second end of filter medium and forms a fluid seal with the filter medium and the filter housing to prevent the flow of water from the filter chamber to the filter outlet. A bypass channel is defined by the sidewall proximate the second end cap, the bypass channel enabling water to flow from the filter chamber around the second end cap to the filter outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
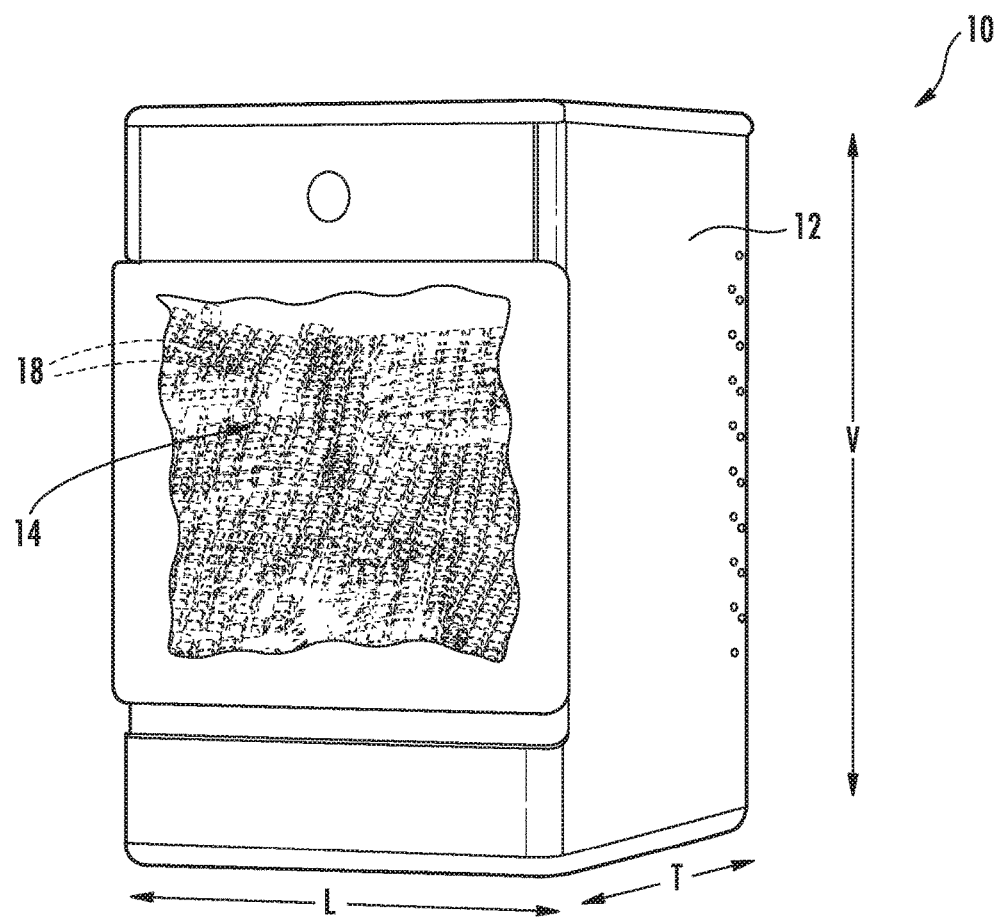
FIG. 1 is a perspective view of a stand-alone ice making appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is directed generally to filters which may be used in non-plumbed appliances. A non-plumbed appliance is a stand-alone appliance that is not connected to plumbing or another water source that is external to the appliance, such as a refrigerator water source. Rather, water is initially supplied to the appliance manually by a user, such as by pouring water into a water tank of the appliance. Examples of non-plumbed appliances in accordance with the present disclosure include stand-alone ice making appliances. It should be understood, however, that the present disclosure is not limited to the above disclosed appliances, and rather that any suitable non-plumbed appliance is within the scope and spirit of the present disclosure. Further, it should be understood that the use of filters in accordance with the present disclosure is not limited to non-plumbed appliances.

In general, a non-plumbed appliance includes a water tank (or reservoir). The water tank may define a storage volume into which a user can supply water for use in the non-plumbed appliance. A filter, as discussed herein, may be disposed in the storage volume for filtering water in the storage volume before the water exits the storage volume. A non-plumbed appliance may further include a pump in fluid communication with the storage volume for actively flowing water from the storage volume. The filter may filter water that is being actively flowed from the storage volume by the pump. The pump may supply the filtered water to other components of the non-plumbed appliance for various purposes.

Referring now to FIG. 1, one embodiment of non-plumbed appliance, in this case a stand-alone ice making appliance 10, in accordance with the present disclosure is illustrated. As illustrated in the figures, appliance 10 defines a vertical direction V, a lateral direction L, and a transverse direction T. The vertical direction V, the lateral direction L, and the transverse direction T are mutually perpendicular and form an orthogonal coordinate system. Various features of appliance 10 are discussed in greater detail below in the context of the figures. However, appliance 10 is used herein only for the purpose of describing exemplary embodiments of the present subject matter. One skilled in the art would appreciate that aspects of the present subject matter may be used in other appliances without departing from the scope of the present disclosure.

Figure 2:
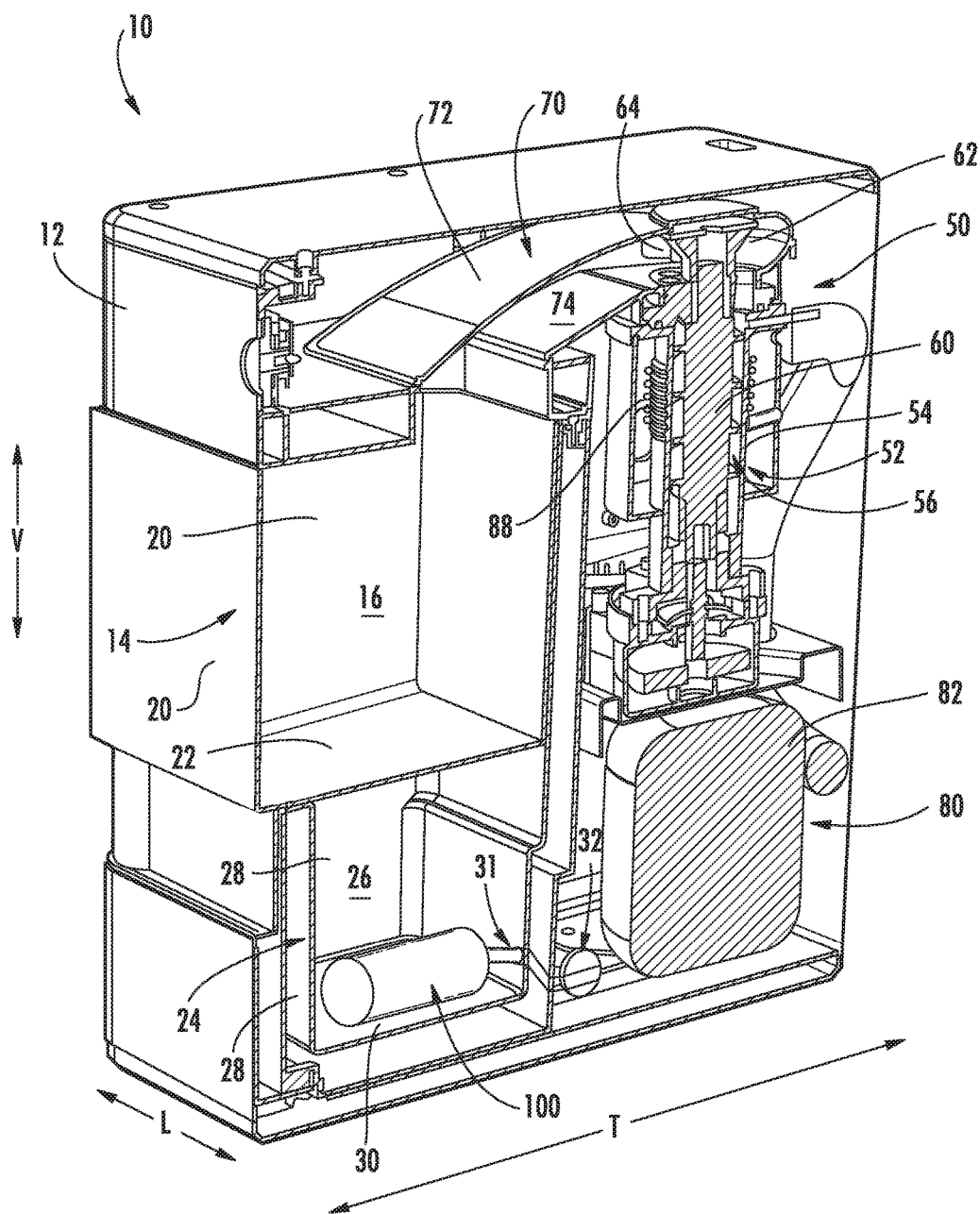
FIG. 2 is a perspective sectional view of a stand-alone ice making appliance in accordance with one embodiment of the present disclosure.
Figure 3:
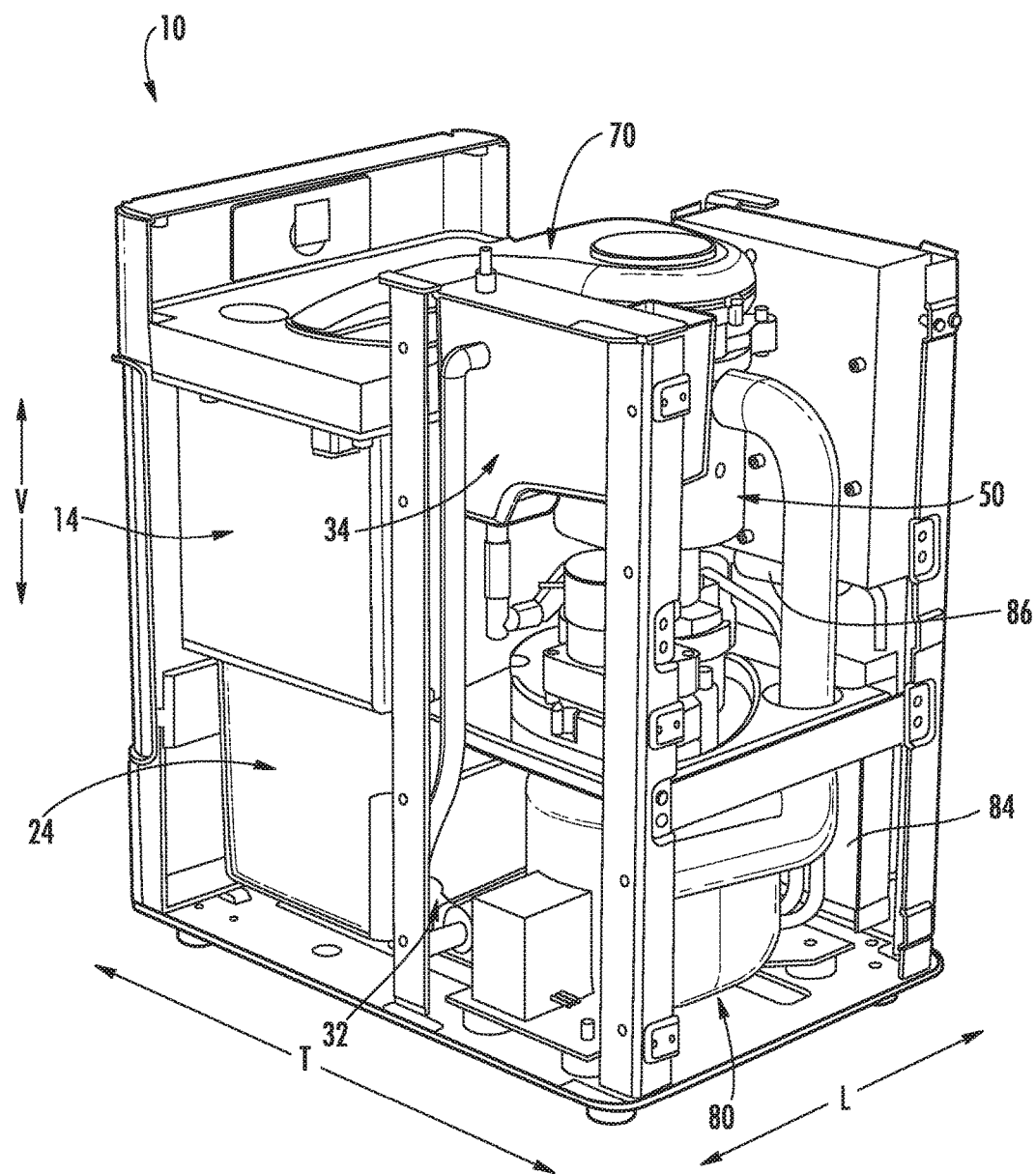
FIG. 3 is a rear perspective view (with a casing removed) of a stand-alone ice making appliance in accordance with one embodiment of the present disclosure.
Figure 4:
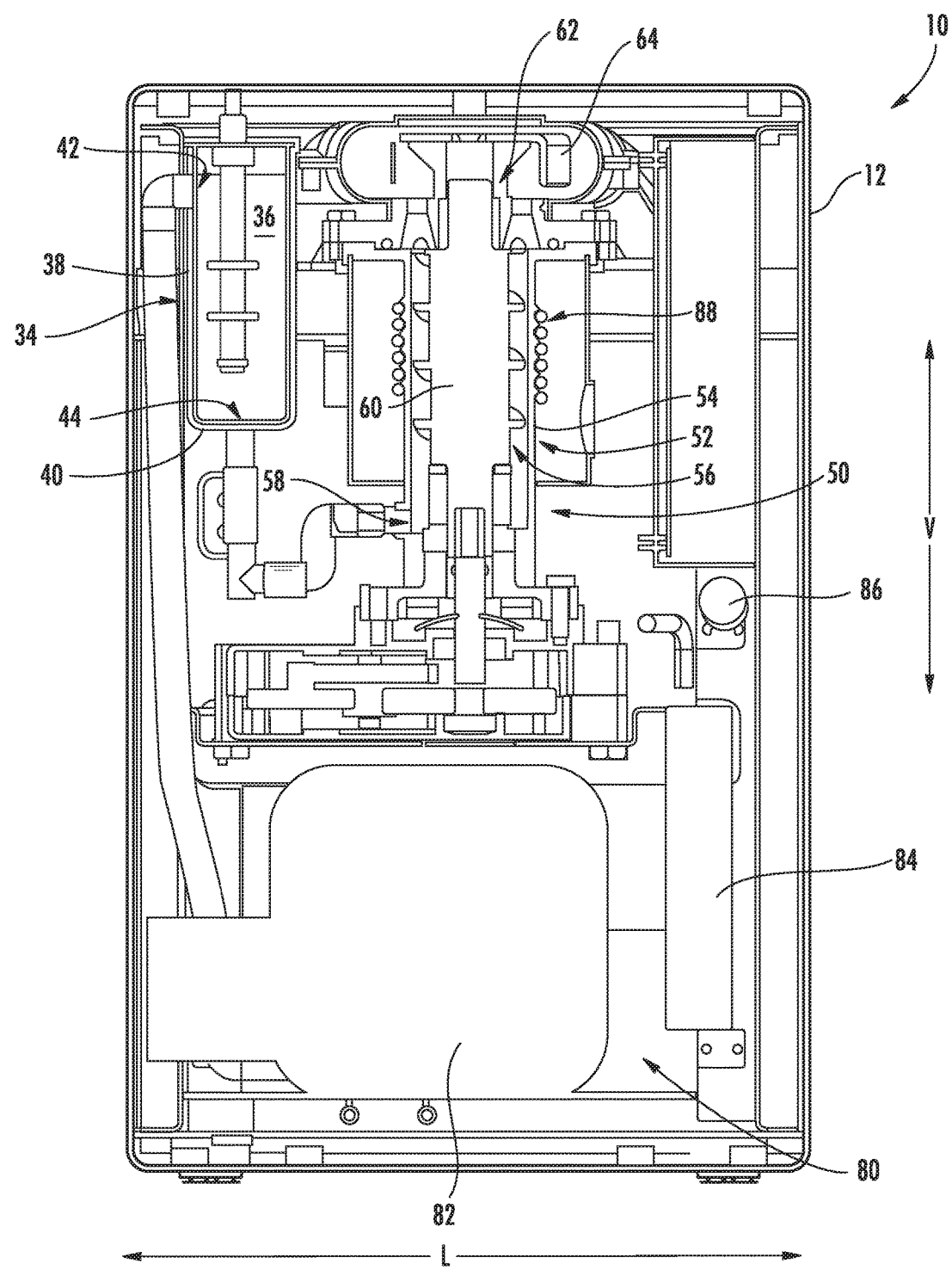
FIG. 4 is a rear sectional view of a stand-alone ice making appliance in accordance with one embodiment of the present disclosure.

As shown, appliance 10 includes an outer casing 12 which generally at least partially houses various other components of the appliance 10. A container 14 is also illustrated. Container 14 defines a first storage volume 16 (see FIG. 2) for the receipt and storage of ice 18 therein. A user of the appliance 10 may access ice 18 within the container 14 for consumption or other uses. Container 14 may include one or more sidewalls 20 and a base wall 22 (see FIG. 2), which may together define the first storage volume 16. In exemplary embodiments, at least one sidewall 20 may be formed from a clear, see-through (i.e. transparent or translucent) material, such as a clear glass or plastic, such that a user can see into the first storage volume 16 and thus view ice 18 therein. Further, in exemplary embodiments, container 14 may be removable, such as from the outer casing 12, by a user. This facilitates easy access by the user to ice within the container 14 and further, for example, may provide access to a water tank 24 (see FIG. 2) of the appliance 10.

Notably, appliances 10 as discussed herein include various features which allow the appliances 10 to be affordable and desirable to typical consumers. For example, the stand-alone feature reduces the cost associated with the appliance 10 and allows the consumer to position the appliance 10 at any suitable desired location, with the only requirement in some embodiments being access to an electrical source. The removable container 14 allows easy access to ice and allows the container 14 to be moved to a different position from the remainder of the appliance 10 for ice usage purposes. Additionally, in exemplary embodiments as discussed herein, appliance 10 is configured to make nugget ice (as discussed herein) which is becoming increasingly popular with consumers.

Referring now generally to FIGS. 2 through 5, various other components of appliances 10 in accordance with the present disclosure are illustrated. For example, as mentioned, appliance 10 includes a water tank 24. The water tank 24 defines a storage volume 26 (also known as a second storage volume) for the receipt and holding of water. Water tank 24 may include one or more sidewalls 28 and a base wall 30 which may together define the second storage volume 26. In exemplary embodiments, the water tank 24 may be disposed below the container 14 along a vertical direction V defined for the appliance 10, as shown.

As discussed, in exemplary embodiments, water is provided to the water tank 24 for use in forming ice. Accordingly, appliance 10 may further include a pump 32. Pump 32 may be in fluid communication with the second storage volume 26. For example, water may be flowable from the second storage volume 26 through an opening 31 defined in the water tank 24, such as in a sidewall 28 thereof, and may flow through a conduit to and through pump 32. Pump 32 may, when activated, actively flow water from the second storage volume 26 therethrough and from the pump 32.

Water actively flowed from the pump 32 may be flowed (for example through a suitable conduit) to a reservoir 34. For example, reservoir 34 may define a third storage volume 36, which may be defined by one or more sidewalls 38 and a base wall 40. Third storage volume 36 may, for example, be in fluid communication with the pump 32 and may thus receive water that is actively flowed from the water tank 24, such as through the pump 32. For example, water may be flowed into the third storage volume 36 through an opening 42 defined in the reservoir 34.

Reservoir 34 and third storage volume 36 thereof may receive and contain water to be provided to an ice maker 50 for the production of ice. Accordingly, third storage volume 36 may be in fluid communication with ice maker 50. For example, water may be flowed, such as through opening 44 and through suitable conduits, from third storage volume 36 to ice maker 50.

Ice maker 50 generally receives water, such as from reservoir, and freezes the water to form ice 18. While any suitable style of ice maker is within the scope and spirit of the present disclosure, in exemplary embodiments, ice maker 50 is a nugget ice maker, and in particular is an auger-style ice maker. As shown, ice maker 50 may include a casing 52 into which water from third storage volume 36 is flowed. Casing 52 is thus in fluid communication with third storage volume 36. For example, casing 52 may include one or more sidewalls 54 which may define an interior volume 56, and an opening 58 may be defined in a sidewall 54. Water may be flowed from third storage volume 36 through the opening 58 (such as via a suitable conduit) into the interior volume 56.

As illustrated, an auger 60 may be disposed at least partially within the casing 52. During operation, the auger 60 may rotate. Water within the casing 52 may at least partially freeze due to heat exchange, such as with a refrigeration system as discussed herein. The at least partially frozen water may be lifted by the auger 60 from casing 52. Further, in exemplary embodiments, the at least partially frozen water may be directed by auger 60 to and through an extruder 62. The extruder 62 may extrude the at least partially frozen water to form ice, such as nuggets of ice 18.

Formed ice 18 may be provided by the ice maker 50 to container 14, and may be received in the first storage volume 16 thereof. For example, ice 18 formed by auger 60 and/or extruder 62 may be provide to the container 14. In exemplary embodiments, appliance 10 may include a chute 70 for directing ice 18 produced by the ice maker 50 towards the first storage volume 16. For example, as shown, chute 70 is generally positioned above container 14 along the vertical direction V. Thus, ice can slide off of chute 70 and drop into storage volume 16 of container 14. Chute 70 may, as shown, extend between ice maker 50 and container 14, and may include a body 72 which defines a passage 74 therethrough. Ice 18 may be directed from the ice maker 50 (such as from the auger 60 and/or extruder 62) through the passage 74 to the container 14. In some embodiments, for example, a sweep 64, which may for example be connected to and rotate with the auger, may contact the ice emerging through the extruder 62 from the auger 60 and direct the ice through the passage 74 to the container 14.

Figure 5:
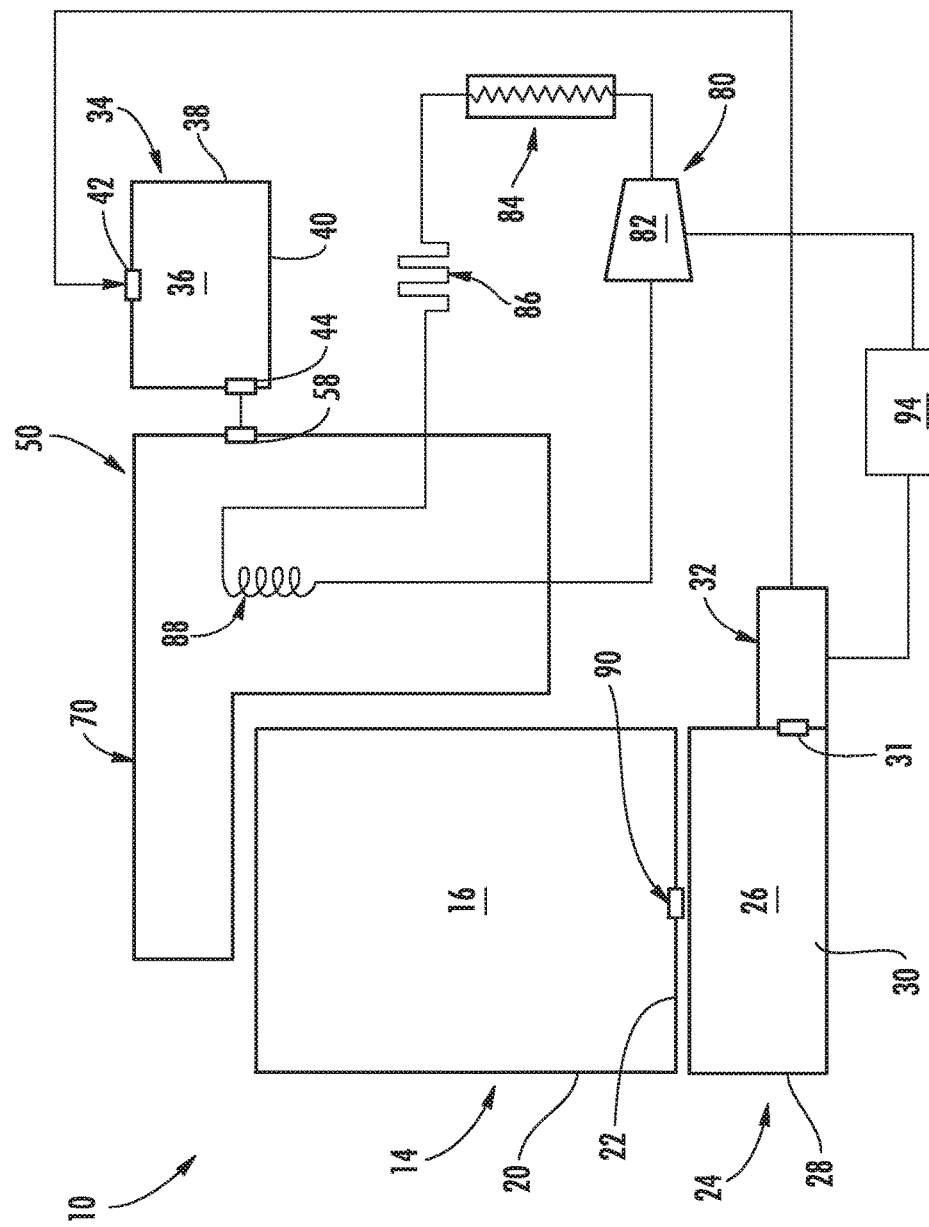
FIG. 5 is a schematic diagram of a stand-alone ice making appliance in accordance with one embodiment of the present disclosure.

As discussed, water within the casing 52 may at least partially freeze due to heat exchange, such as with a refrigeration system. In exemplary embodiments, ice maker 50 may include a sealed refrigeration system 80. The sealed refrigeration system 80 may be in thermal communication with the casing 52 to remove heat from the casing 52 and interior volume 56 thereof, thus facilitating freezing of water therein to form ice. Sealed refrigeration system 80 may, for example, include a compressor 82, a condenser 84, a throttling device 86, and an evaporator 88. Evaporator 88 may, for example, be in thermal communication with the casing 52 in order to remove heat from the interior volume 56 and water therein during operation of sealed system 80. For example, evaporator 88 may at least partially surround the casing 52. In particular, evaporator 88 may be a conduit coiled around and in contact with casing 52, such as the sidewall(s) 54 thereof. During operation of sealed system 80, refrigerant exits evaporator 88 as a fluid in the form of a superheated vapor and/or vapor mixture. Upon exiting evaporator 88, the refrigerant enters compressor 82 wherein the pressure and temperature of the refrigerant are increased such that the refrigerant becomes a superheated vapor. The superheated vapor from compressor 82 enters condenser 84 wherein energy is transferred therefrom and condenses into a saturated liquid and/or liquid vapor mixture. This fluid exits condenser 84 and travels through throttling device 86 that is configured for regulating a flow rate of refrigerant therethrough. Upon exiting throttling device 86, the pressure and temperature of the refrigerant drop at which time the refrigerant enters evaporator 88 and the cycle repeats itself. In certain exemplary embodiments, as illustrated in FIG. 5, throttling device 86 may be a capillary tube. Notably, in some embodiments, sealed system 80 may additionally include fans (not shown) for facilitating heat transfer to/from the condenser 84 and evaporator 88.

As discussed, in exemplary embodiments, ice 18 may be nugget ice. Nugget ice is ice that that is maintained or stored (i.e. in first storage volume 16 of container 14) at a temperature greater than the melting point of water or greater than about thirty-two degrees Fahrenheit. Accordingly, the ambient temperature of the environment surrounding the container 14 may be at a temperature greater than the melting point of water or greater than about thirty-two degrees Fahrenheit. In some embodiments, such temperature may be greater than forty degrees Fahrenheit, greater than fifty degrees Fahrenheit, or greater than 60 degrees Fahrenheit.

Ice 18 held within the first storage volume 16 may gradually melt. The melting speed is increased for nugget ice due to the increased maintenance/storage temperature.

Accordingly, drain features may advantageously be provided in the container for draining such melt water. Additionally, and advantageously, the melt water may in exemplary embodiments be reused by appliance 10 to form ice.

For example, in some embodiments as illustrated in FIG. 5, a drain aperture 90 may be defined in the base wall 22. Drain aperture 90 may allow water to flow from the first storage volume 16 and container 14 generally. Further, in exemplary embodiments, water flowing from the first storage volume 16 and container 14 may, due to gravity and the vertical alignment of the container 14 of water tank 24, flow into the second storage volume 26.

In exemplary embodiments, appliance 10 may further include a controller 94. Controller 94 may for example, be configured to operate the appliance 10 based on, for example, user inputs to the appliance 10 (such as to a user interface thereof), inputs from various sensors disposed within the appliance 10, and/or other suitable inputs. Controller 94 may for example include one or more memory devices and one or more microprocessors, such as general or special purpose microprocessors operable to execute programming instructions or micro-control code associated with appliance 10 operation. The memory may represent random access memory such as DRAM, or read only memory such as ROM or FLASH. In one embodiment, the processor executes programming instructions stored in memory. The memory may be a separate component from the processor or may be included onboard within the processor.

In exemplary embodiments, controller 94 may be in operative communication with the pump 32. Such operative communication may be via a wired or wireless connection, and may facilitate the transmittal and/or receipt of signals by the controller 94 and pump 32. Controller 94 may be configured to activate the pump 32 to actively flow water. For example, controller 94 may activate the pump 32 to actively flow water therethrough when, for example, reservoir 34 requires water. A suitable sensor(s), for example, may be provided in the third storage volume 36. The sensor(s) may be in operative communication with the controller 94 may be transmit signals to the controller 94 which indicate whether or not additional water is desired in the reservoir 34. When controller 94 receives a signal that water is desired, controller 94 may send a signal to pump 32 to activate that pump. In addition, in exemplary embodiments, controller 94 may be in operative communication with the sealed system 80, such as with the compressor 82 thereof, and may activate the sealed system 80 as desired or required for ice making purposes.

Figure 6:
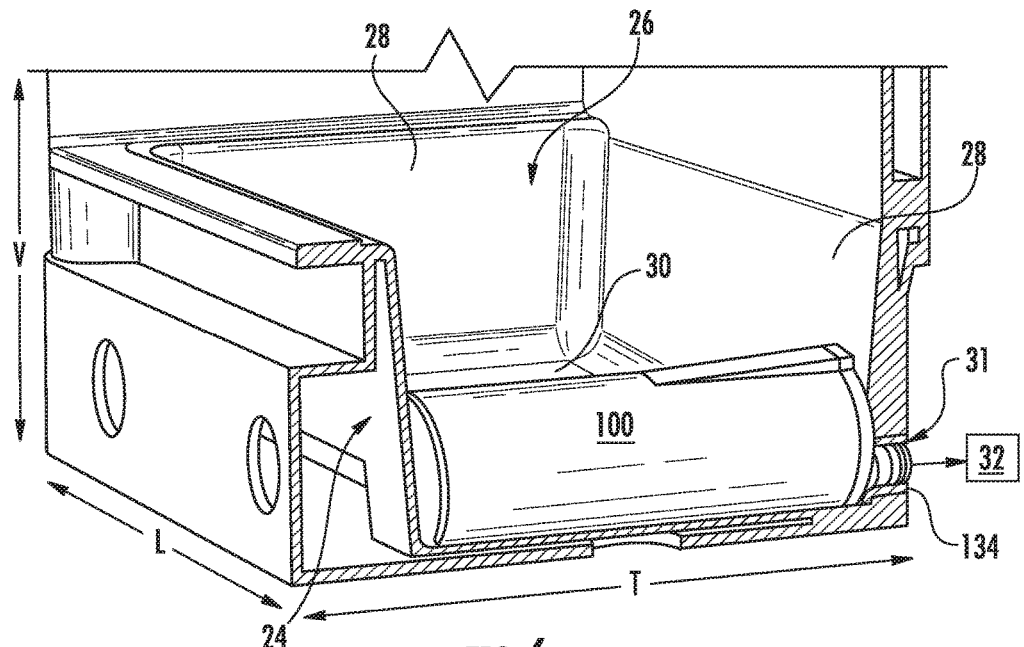
FIG. 6 is a cross-sectional view of a non-plumbed appliance water tank and a filter disposed therein in accordance with one embodiment of the present disclosure.

Referring now to FIG. 6, in exemplary embodiments as shown, a filter 100 may be provided. The filter 100 may, for example, be used in non-plumbed appliance 10, and may thus be disposed in storage volume 26 of water tank 24 for filtering water that is provided in storage volume 26, such as before the water is flowed from storage volume 26. Accordingly, water within storage volume 26 may flow through filter 100, and from filter 100 to downstream components of non-plumbed appliance 10, such as pump 32.

Figure 7:
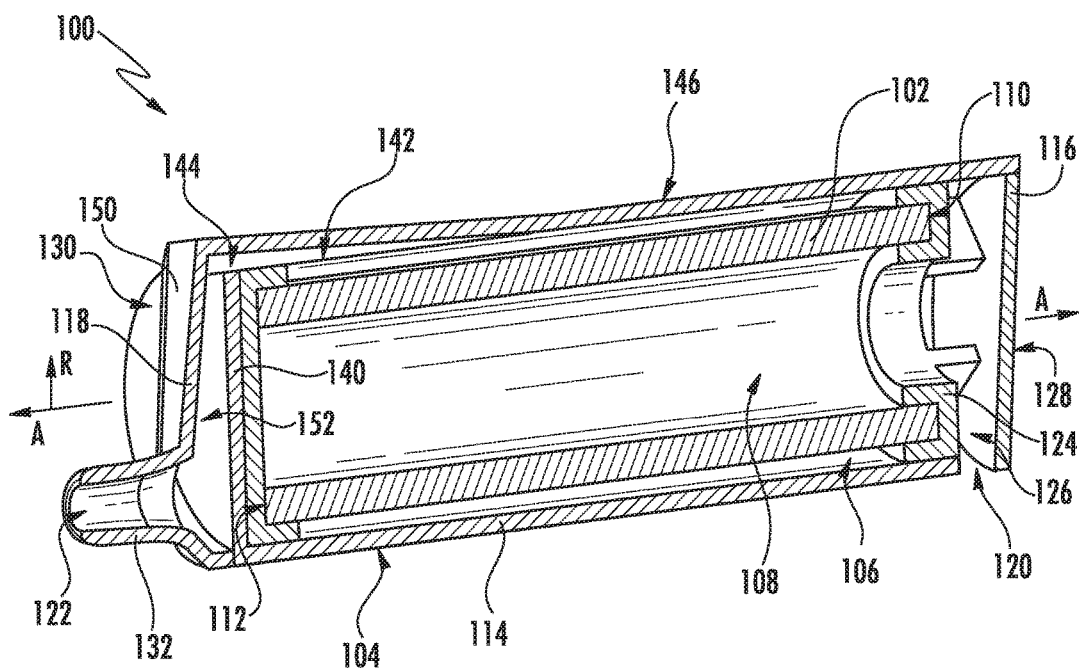
FIG. 7 is a perspective cross-sectional view of a filter for non-plumbed appliance in accordance with one embodiment of the present disclosure.

Referring now to FIG. 7, filter 100 may generally define a longitudinal direction or axis A and a radial direction R that extends orthogonally from longitudinal axis A. In addition, when filter 100 is properly installed in non-plumbed appliance 10, filter 100 also defines a vertical direction V, a lateral direction L, and a transverse direction T that are mutually perpendicular and form an orthogonal coordinate system corresponding to the coordinate system of non-plumbed appliance 10.

Filter 100 may include a filter medium 102 which is operable to remove contaminants from water flowing through filter medium 102. Contaminants may include but are not limited to dirt, sediment, sand, rust, lead, cysts, and other debris which may be mechanically filtered from the water, as well as chlorine, chloramine, and volatile organic compounds such as chloroform, lindane, and atrazine which can be adsorbed into pore surfaces in the filter medium 102. Any suitable filter medium 102 may be used, including for example, activated carbon blocks, pleated polymer sheets, spun cord materials, or melt blown materials. In exemplary embodiments, a filter medium 102 may include a bacteriostatic agent such as silver or other additives.

Filter 100 may further include a housing 104 which generally houses the filter medium 102. Accordingly, filter medium 102 in these embodiments is disposed within a filter chamber 106 of housing 104. Further, in exemplary embodiments, filter medium 102 may for example have a hollow cylindrical shape which defines an interior passage 108. In addition, filter medium 102 may extend along the longitudinal axis A between a first end 110 and a second end 112. As discussed herein, water may be filtered via a flow path from interior passage 108 through filter medium 102 into filter chamber 106. However, one skilled in the art will appreciate that other filter arrangements are possible and within the scope of the present subject matter. For example, alternative embodiments may use any flow arrangement whereby unfiltered water is drawn or forced through a filter medium to remove particulates and contaminates.

Housing 104 may, for example, include a sidewall 114 which extends along the longitudinal axis A between a first end wall 116 and a second end wall 118. Sidewall 114 may, for example, have a hollow cylindrical shape. Housing 104 may be constructed from any suitably rigid material. For example, according to the illustrated embodiment, housing 104 is injection molded using a suitable plastic material, such as injection molding grade high impact polystyrene (HIPS) or acrylonitrile butadiene styrene (ABS). One or more inlets 120 and one or more outlets 122 may be defined in housing 104. Unfiltered water may flow into the housing 104 through the inlets 120, and filtered water may flow from the housing 104 through outlets 122. First end wall 116 and second end wall 118 are integrally formed with or connected to sidewall 114 to form a hermetically sealed housing 104. In this manner, unfiltered water is prevented from entering housing 104 except at the desired location, i.e., through inlet 120.

Figure 8:
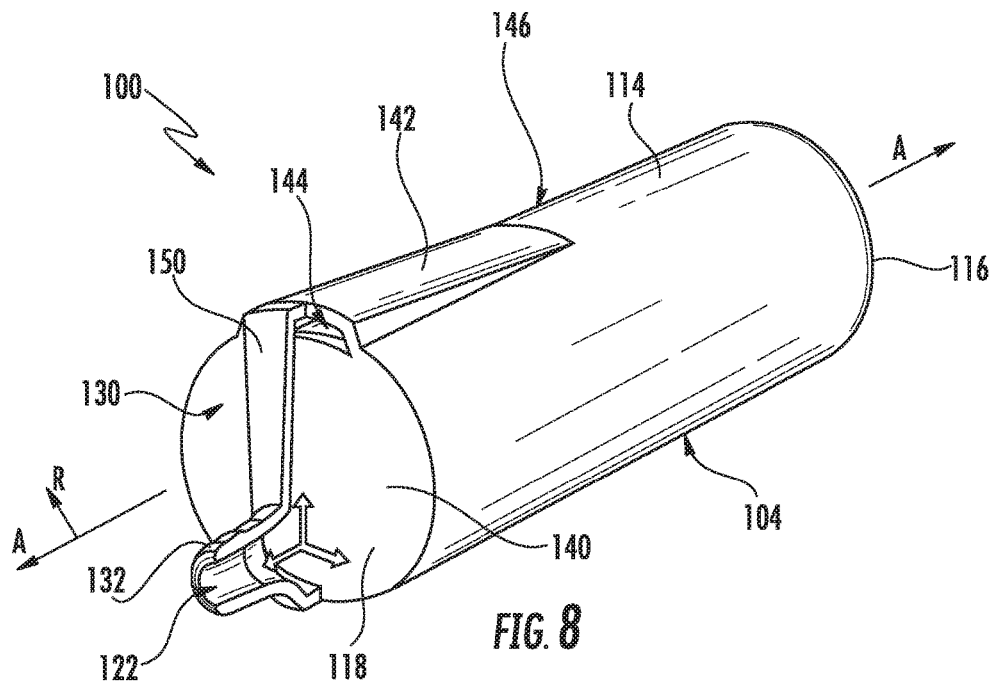
FIG. 8 is a partial perspective view of the exemplary filter of FIG. 7.
Figure 9:
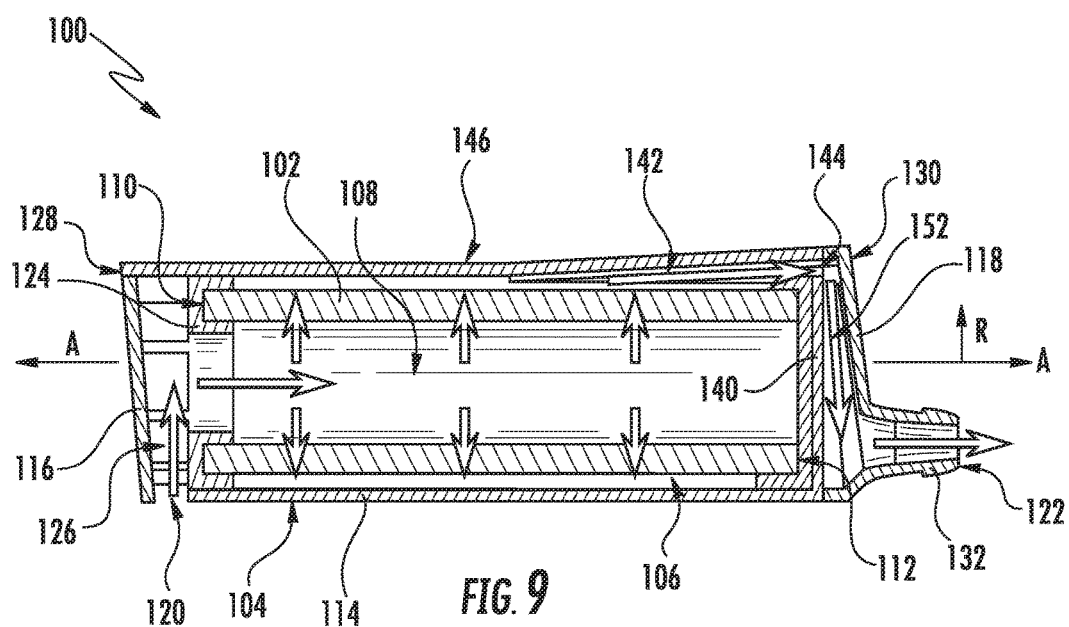
FIG. 9 is a side cross-sectional view of the exemplary filter of FIG. 7, with the flow path of water illustrated by the unlabeled arrows.

In exemplary embodiments as illustrated in FIGS. 7 through 9, inlet 120 may be defined proximate the first end wall 116 relative to the second end wall 118 along the longitudinal axis A (i.e., closer to the first end wall 116 than the second end wall 118 along the longitudinal axis A). The inlet 120, for example, may be defined in the sidewall 114 and may be contiguous with the first end wall 116, as shown. Notably, the inlet 120 may only extend about a portion of the periphery of sidewall 114 and thus may not be an entirely peripheral or circumferential inlet. This facilitates correct orientation of the filter 100, as the inlet 120 is desirably located at a bottom of the filter 100 along the vertical direction V when the filter 100 is correctly disposed within the storage volume 26.

An inlet cap 124 may be disposed in filter chamber 106. More specifically, inlet cap 124 may be connected to filter medium 102, e.g., to first end 110 end of filter medium 102 proximate first end wall 116. Inlet cap 124 may be positioned between filter medium 102 and first end wall 116 and may provide a partition to separate filtered and unfiltered water in the filter chamber 106. Inlet cap 124 may also at least partially define an inlet channel 126. Inlet channel 126 is in fluid communication with inlet 120 and interior passage 108 of filter medium 102, such that water may flow from inlet 120 through inlet channel 126 into interior passage 108.

In alternative embodiments, the inlet 120 may be defined in the first end wall 116, and may for example be contiguous with the sidewall 114. Notably, the inlet 120 in these embodiments may be offset along an outer surface 128 of the first end wall 116 from a centroid of the outer surface 128, thus facilitating correct orientation of the filter 100. For example, the inlet 120 may be disposed at or adjacent to the periphery of the first end wall 116 (and may, for example, only extend about a portion of this periphery).

Housing 104 also includes outlet 122, which may be defined proximate the second end wall 118 relative to the first end wall 116 along the longitudinal axis A (i.e., closer to the second end wall 118 than the first end wall 116 along the longitudinal axis A). For example, in exemplary embodiments as illustrated, housing 104 may include a nozzle 132 which protrudes (i.e., away from filter chamber 106) from the second end wall 118 along the longitudinal axis A. Nozzle 132 (through which water may flow) may define the outlet 122, as shown.

Nozzle 132 (and thus the outlet 122) may, as shown, be offset along an outer surface 130 of the second end wall 118 from a centroid of the outer surface 130, thus facilitating correct orientation of the filter 100. Alternatively, however, nozzle 132 (and thus the outlet 122) may be aligned with the centroid of the outer surface 130. Nozzle 132 may be configured to be received within opening 31 of water tank 24. In exemplary embodiments, a female fitting 134 (FIG. 6) may be disposed within the opening 31 to receive nozzle 132 and facilitate a connection between filter 100 and a downstream conduit (which for example is a component of or leads to pump 32).

Notably, inlet 120, outlet 122, and opening 31 are positioned toward the bottom of storage volume 26 when filter 100 is installed in water tank 24, and the top portion of housing 104 is airtight. Such a construction is desirable to enable complete draining of water within during operation. However, as explained above, without some modification of filter 100, water would tend to flow only along the bottom of housing 104, such that filter medium 102 might not remain completely submerged. In addition, because housing 104 is sealed, air that is present within housing 104 may not escape because inlet 120 and outlet 122 are at the bottom of housing 104. As a result, filter performance may be unstable, the pressure drop across filter 100 may increase, and filter medium 102 may be depleted in an unbalanced manner.

In order to ensure that filter medium 102 remains submerged, that air is purged from housing 104, and that the above mentioned problems are rectified, filter 100 may further include a partition, such as divider wall 140. According to the illustrated embodiment of FIGS. 7 through 9, divider wall 140 is positioned proximate second end wall 118 of housing 104 to prevent the flow of water from filter chamber 106 to outlet 122. As illustrated, divider wall 140 may be defined by housing 104, i.e., divider wall 140 may be integrally molded with housing 104. However, according to alternative embodiments, divider wall 140 may be a separate component that is mounted within housing 104, e.g., by using a suitable adhesive, by ultrasonic welding, etc.

According to the illustrated embodiment, divider wall 140 extends substantially along the radial direction R, i.e., in a plane that is substantially perpendicular to the longitudinal axis A. Divider wall 140 forms a fluid seal with housing 104.

In this manner, divider wall 140 prevents unrestricted flow of water from filter chamber 106 to outlet 122. Housing 104 further defines a bypass channel 142 to allow water to flow past divider wall 140.

As shown in FIGS. 7 through 9, bypass channel 142 may be defined in part by sidewall 114, by second end wall 118, and by a flow aperture 144 defined in divider wall 140. In this regard, bypass channel 142 is a protruding portion of sidewall 114 and second end wall 118. More specifically, bypass channel 142 is a passage that extends outwardly from sidewall 114 along the radial direction R. Bypass channel 142 may extend along the length of the sidewall 114, i.e., along the longitudinal axis A, or only along a portion of the length, and may extend through only a portion of the periphery of the sidewall 114. Bypass channel 142 may generally provide extra space in filter chamber 106, e.g., to ensure there are no flow restrictions between housing 104 and filter medium 102 and to allow water to flow freely through flow aperture 144.

As best illustrated in FIG. 8, flow aperture 144 is positioned proximate a top side of housing 104 along the vertical direction V. Flow aperture 144 is thus positioned at a periphery of divider wall 140 along the radial direction R on an opposite side of housing 104 relative to inlet 120 and outlet 122. For example, flow aperture 144 may be positioned approximately 180 degrees around the periphery of divider wall 140 relative to inlet 120.

As illustrated, flow aperture 144 is an arcuate slot positioned entirely above filter medium 102 along the vertical direction V. In addition, the cross sectional area of flow aperture 144 is approximately equivalent to the cross sectional area of outlet 122. In this manner, flow aperture 144 is capable of operating at water flow rates similar to fluid outlet 122 and does not introduce any significant flow restriction. However, one skilled in the art will appreciate that the size, geometry, location, and configuration of flow aperture 144 may be modified while remaining within the scope of the present subject matter.

Bypass channel 142 extends along the longitudinal axis A from second end wall 118 toward first end wall 116. According to the illustrated exemplary embodiment, bypass channel 142 is tapered such that a depth of bypass channel 142 is largest proximate second end wall 118 (i.e., at flow aperture 144) and decreases as bypass channel 142 extends toward first end wall 116. For example, bypass channel 142 may extend to approximately a midpoint 146 of housing 104 along the longitudinal axis A. One skilled in the art will appreciate that bypass channel 142 may have a different, size, shape, position, and orientation while remaining within the scope of the present subject matter.

In some embodiments, as illustrated in FIGS. 7 through 9, a protrusion 150 may extend from second end wall 118. More specifically, protrusion 150 may be defined by second end wall 118 and extend away from the filter chamber 106 along the longitudinal axis A. An outlet channel 152 may be defined between second end wall 118 and divider wall 140. Protrusion 150 may provide extra space within outlet channel 152, e.g., to ensure there are no flow restrictions between divider wall 140 and second end wall 118. As illustrated, outlet channel 152 is in fluid communication with both flow aperture 144 and outlet 122, such that filter water flows from flow aperture 144 through outlet channel 152 and out of filter 100 via outlet 122. Notably, protrusion 150 may also be configured to engage water tank 24, e.g., to act as a stop to ensure filter 100 is properly seated in female fitting 134 or to ensure proper orientation of filter 100 when installed.

As mentioned above, unfiltered water may flow on a particular flow path through filter 100 and filter medium 102 to be filtered before being exhausted through outlet 122. For example, as best shown in FIG. 9, water may flow from storage volume 26 into housing 104 through inlet 120. The unfiltered water then flows into interior passage 108 of filter medium 102 through inlet channel 126. The unfiltered water passes through filter medium 102, where particulates and contaminants are removed before the water flows into filter chamber 106. Notably, divider wall 140 prevents the filtered water from flowing directly from filter chamber 106 to outlet 122. Instead, the filtered water collects until it fills the entire filter chamber 106, thereby purging any air trapped within housing 104 out of filter chamber 106 through outlet 122. Water continues to fill filter chamber 106 until the water level rises above and breaches divider wall 140, such that it flows through flow aperture 144 to outlet 122. Filtered water then exits outlet 122 and flows through opening 31 in water tank 24.

Filter 100 (as well as other exemplary filters described herein) may further include a locking tab (not shown) that is configured to engage a mating coupler (not shown) that is defined by water tank 24. For example, the locking tab may extend from first end wall 116 of housing 104 along the longitudinal axis A away from filter medium 102. In addition, the mating coupler may extend from water tank 24 into storage volume 26 and have a profile that corresponds to the locking tab. These features interact via contact with each other to facilitate proper installation of the filter 100 within the storage volume 26, and to further secure the filter 100 within the storage volume 26 and maintain the position of the filter 100 within the storage volume 26 despite the filter 100 being partially or fully submerged in water. Exemplary embodiments may also include a lever (not shown) that extends from the housing 104 adjacent the locking tab. In this manner, the lever may be manipulated by a user to engage or disengage the locking tab and mating coupler to facilitate both installation and removal of filter 100.

Figure 10:
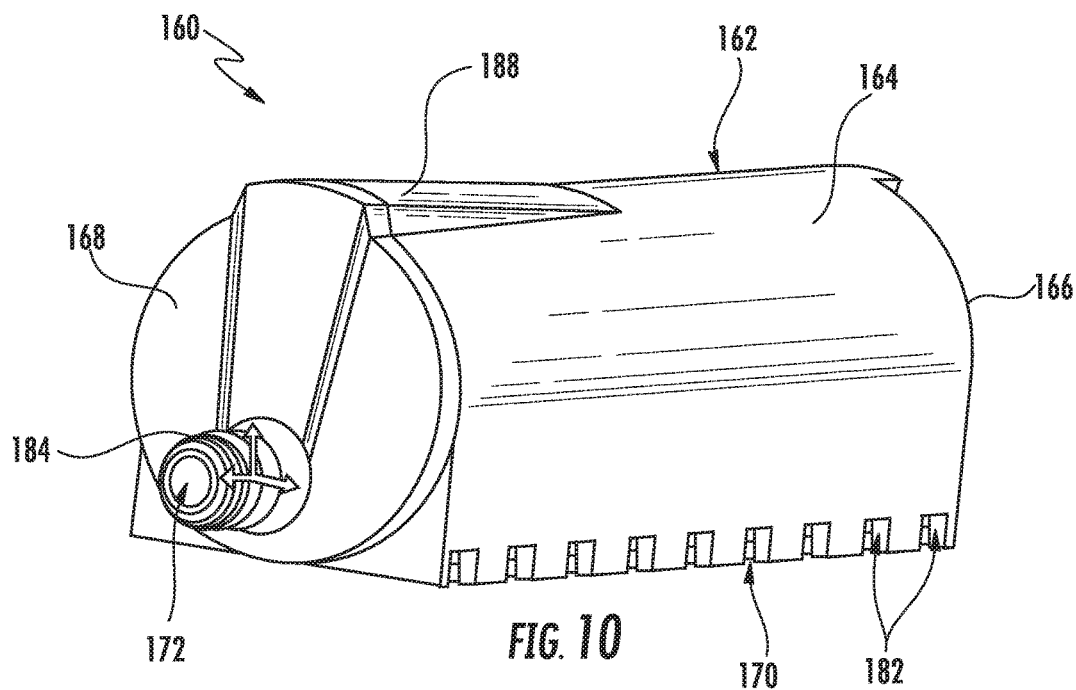
FIG. 10 is a perspective view of a filter for a non-plumbed appliance in accordance with another embodiment of the present disclosure.
Figure 11:
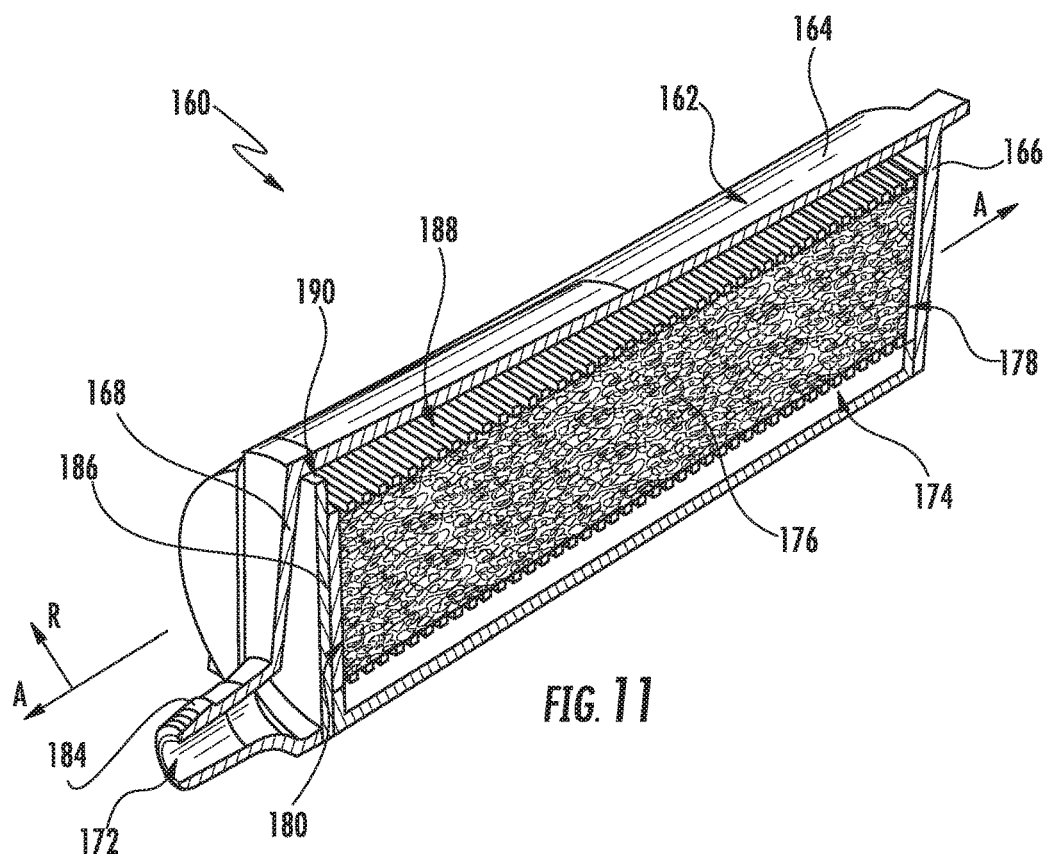
FIG. 11 is a perspective cross-sectional view of the exemplary filter of FIG. 10.
Figure 12:
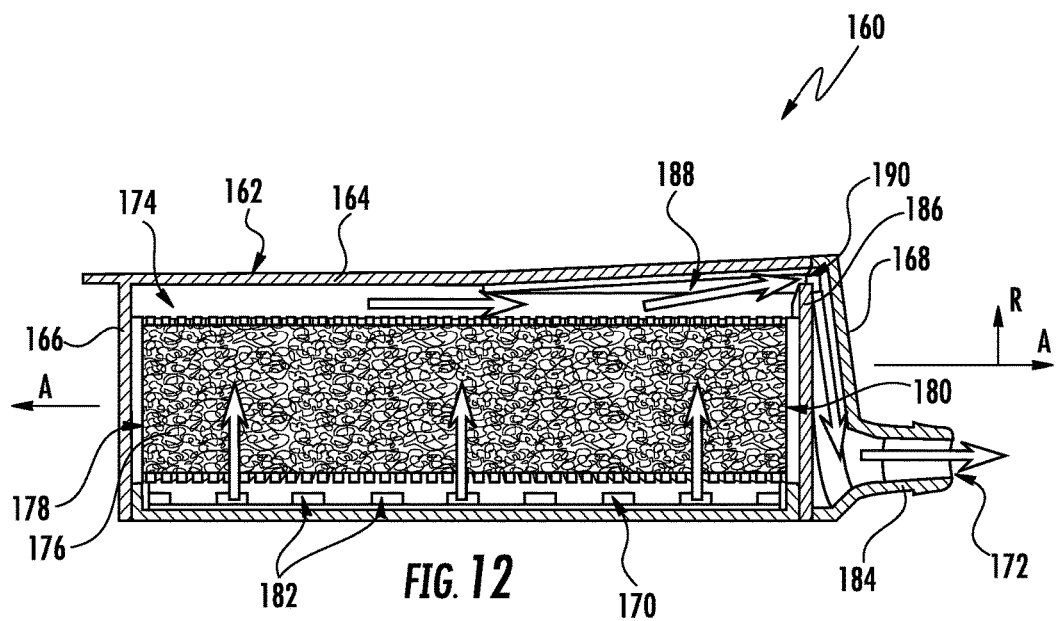
FIG. 12 is a side cross-sectional view of the exemplary filter of FIG. 10, with the flow path of water illustrated by the unlabeled arrows.

FIGS. 10 through 12 provide a filter 160 for a non-plumbed appliance according to an exemplary embodiment of the present subject matter. Filter 160 may be used with or in any suitable non-plumbed appliance. For example, filter 160 may be used in non-plumbed appliance 10 (FIG. 1) in place of filter 100. Notably, filter 160 may be similar to filter 100 in most respects, except as described below.

For example, filter 160 may include a housing 162 including a sidewall 164 which extends along a longitudinal axis A between a first end wall 166 and a second end wall 168. Housing 162 may define one or more inlets 170 for drawing in unfiltered water and one or more outlets 172 for discharging filtered water. Housing 162 may define a filter chamber 174 for receiving a filter medium 176.

Filter medium 176 may extend along the longitudinal axis A between a first end 178 and a second end 180, and may be operable to remove contaminants from water flowing through filter medium 176. By contrast to filter medium 102 of filter 100, filter medium 176 includes an elongated rectangular filter block enclosed in a perforated casing, although other filter media may be used as well. Filter medium 176 extends along an entire width of housing 162, e.g., from one end of sidewall 164 to the other along the transverse direction T.

According to the illustrated embodiment, inlet 170 of filter 160 may include a plurality of apertures 182. As illustrated, apertures 182 are defined by sidewall 164 and positioned at a bottom of housing 162 along the vertical direction V. Apertures 182 are preferably evenly spaced along the length of housing 162, e.g., along longitudinal axis A of filter 160. In this manner, an even flow distribution may be achieved through inlet 170 along the longitudinal axis A.

Outlet 172 may be defined proximate the second end wall 168, similar to outlet 122 of filter 100. For example, in exemplary embodiments as illustrated, housing 162 may include a nozzle 184 which protrudes (i.e., away from filter chamber 174) from the second end wall 168 along the longitudinal axis A and defines outlet 172.

Filter 160 may further include a partition, such as divider wall 186 positioned proximate second end wall 168 of housing 162 to prevent the flow of water from filter chamber 174 to outlet 172. Similar to divider wall 140, divider wall 186 forms a fluid seal with housing 162 and prevents unrestricted flow of water from filter chamber 174 to outlet 172. Housing 162 further defines a bypass channel 188 to allow water to flow past divider wall 186. Similar to bypass channel 142, bypass channel 188 is a protruding portion of sidewall 164 that is in fluid communication with a flow aperture 190 defined in divider wall 186. In this manner, filtered water from filter chamber 174 may flow freely through bypass channel 188 and flow aperture 190 to outlet 172.

When filter 160 is installed in non-plumbed appliance 10, unfiltered water may flow on a particular flow path through filter 160 and filter medium 176 to be filtered before being exhausted through outlet 172. For example, as best shown in FIG. 12, water may flow from storage volume 26 into housing 104 through apertures 182 of inlet 170. The unfiltered water then flows upward along a substantially vertical direction V through filter medium 176. Filtered water then flows over divider wall 186 and through outlet 172 in a manner similar to that described with respect to filter 100. In this manner, air within housing 162 is purged from filter 160 and the entire filter medium 176 is utilized, thus ensuring improved performance throughout the lifetime of filter 160.

FIGS. 13 through 19 provide a filter 200 for a non-plumbed appliance according to an exemplary embodiment of the present subject matter. Filter 200 may be used with or in any suitable non-plumbed appliance. For example, filter 200 may be used in non-plumbed appliance 10 (FIG. 1) in place of filter 100. Notably, filter 200 may be similar to filter 100 in most respects, except as described below.

Figure 13:
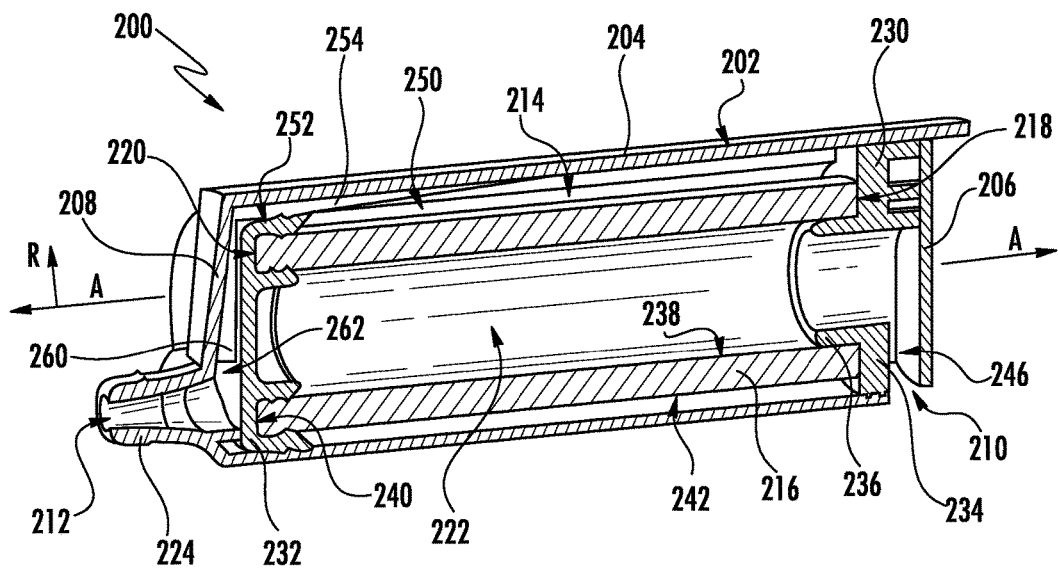
FIG. 13 provides a perspective cross-sectional view of a filter for a non-plumbed appliance in accordance with another embodiment of the present disclosure.

For example, referring to FIG. 13, filter 200 may include a housing 202 including a sidewall 204 which extends along the longitudinal axis A between a first end wall 206 and a second end wall 208. Housing 202 may define one or more inlets 210 for drawing in unfiltered water and one or more outlets 212 for discharging filtered water. Housing 202 may define a filter chamber 214 for receiving a filter medium 216.

Filter medium 216 may be disposed within filter chamber 214 and may extend along the longitudinal axis A between a first end 218 and a second end 220. Filter medium 216 may be operable to remove contaminants from water flowing through filter medium 216. Further, in exemplary embodiments, filter medium 216 may have a hollow cylindrical shape which defines an interior passage 222. As discussed herein, water may be filtered via a flow path from interior passage 222 through filter medium 216 into filter chamber 214.

In exemplary embodiments as illustrated in FIGS. 13 through 16, inlet 210 may be defined proximate first end wall 206 relative to second end wall 208 along the longitudinal axis A (i.e., closer to first end wall 206 than second end wall 208 along the longitudinal axis A). For example, inlet 210 may be defined in sidewall 204 and may be contiguous with first end wall 206, as shown. Notably, inlet 210 may only extend about a portion of the periphery of sidewall 204 and thus may not be an entirely peripheral or circumferential inlet (see, e.g., FIG. 14). This facilitates correct orientation of filter 200 and positioning of inlet 210, as inlet 210 is desirably located at a bottom of filter 200 along the vertical direction V when filter 200 is correctly disposed within the storage volume 26. However, according to alternative embodiments, inlet 210 may be positioned at any location on housing 202 and may have any suitable size and geometry.

Outlet 212 may be defined proximate second end wall 208, similar to outlet 122 of filter 100. For example, in exemplary embodiments as illustrated, housing 202 may include a nozzle 224 which protrudes (e.g., away from filter chamber 214) from second end wall 208 along the longitudinal axis A and defines outlet 212.

According to the illustrated embodiment, a first end cap 230 is positioned at first end 218 of filter medium 216 and forms a fluid seal with filter medium 216 and housing 202, as described below. Similarly, a second end cap 232 is positioned at second end 220 of filter medium 216 and forms a fluid seal with filter medium 216 and housing 202, as described below.

First end cap 230 and second end cap 232 may be constructed of any suitably flexible and resilient material. For example, first end cap 230 and second end cap 232 may be constructed from molded silicone or thermoplastic elastomers (TPEs). More specifically, end caps 230, 232 may be constructed from TPEs such as thermoplastic polyurethane elastomers, polyether-ester block copolymer thermoplastic elastomer, styrenic block copolymer elastomers, thermoplastic polyolefin elastomer, polyether-block-amide thermoplastic elastomer, and other materials. According to an exemplary embodiment, the hardness of the end cap material could range from Shore A 10 to Shore A 60. However, one skilled in the art will appreciate that other materials having a different hardness may be used while remaining within the scope of the present subject matter.

According to the illustrated embodiment, first end cap 230 forms a fluid seal with filter medium 216 and housing 202. For example, first end cap 230 defines a sealing block 234 and a sealing flange 236 that are configured to receive filter medium 216 and form a two-sided seal with filter medium 216. More specifically, sealing block 234 forms a first fluid seal with first end 218 of filter medium 216. In addition, sealing block 234 of first end cap 230 forms a fluid seal with housing 202, or more particularly, with sidewall 204. Sealing flange 236 extends from sealing block 234 into interior passage 222 along the longitudinal axis A of filter medium 216 to form a second fluid seal with an interior surface 238 of filter medium 216. Such a fluid seal is preferable because the pressure of water within interior passage 222 acts to further force sealing flange 236 into sealing engagement with interior surface 238 of filter medium 216.

As illustrated in FIG. 13, sealing flange 236 extends into interior passage 222 along the longitudinal axis A, such that the pressure of water flowing from interior passage 222 radially outward to filter chamber 214 urges sealing flange 236 into sealing engagement with filter medium 216. However, one skilled in the art will appreciate that according to an alternative embodiment, sealing flanges may be positioned on an outer surface 242 of filter medium 216. For example, when water flows from outside filter medium 216 radially inward along the radial direction R into interior passage 222, pressure from the flowing water may urge sealing flanges placed on the outside of filter medium 216 into sealing engagement with outer surface 242 of filter medium 216. One skilled in the art will appreciate that other geometries of end caps 230, 232 may define different sealing flanges for forming different sealing arrangements with filter medium 216 while remaining within the scope of the present subject matter.

According to the illustrated embodiment, second end cap 232 defines a circumferential groove 240 that is configured to receive second end 220 of filter medium 216. In this manner, second end cap 232 forms a three-sided seal with filter medium 216. More specifically, second end cap 232 forms a first seal with outer surface 242 of filter medium 216, a second seal with second end 220 of filter medium 216, and a third seal with interior surface 238 of filter medium 216. In addition, second end cap 232 forms a fluid seal with housing 202, or more particularly, with sidewall 204.

Figure 14:
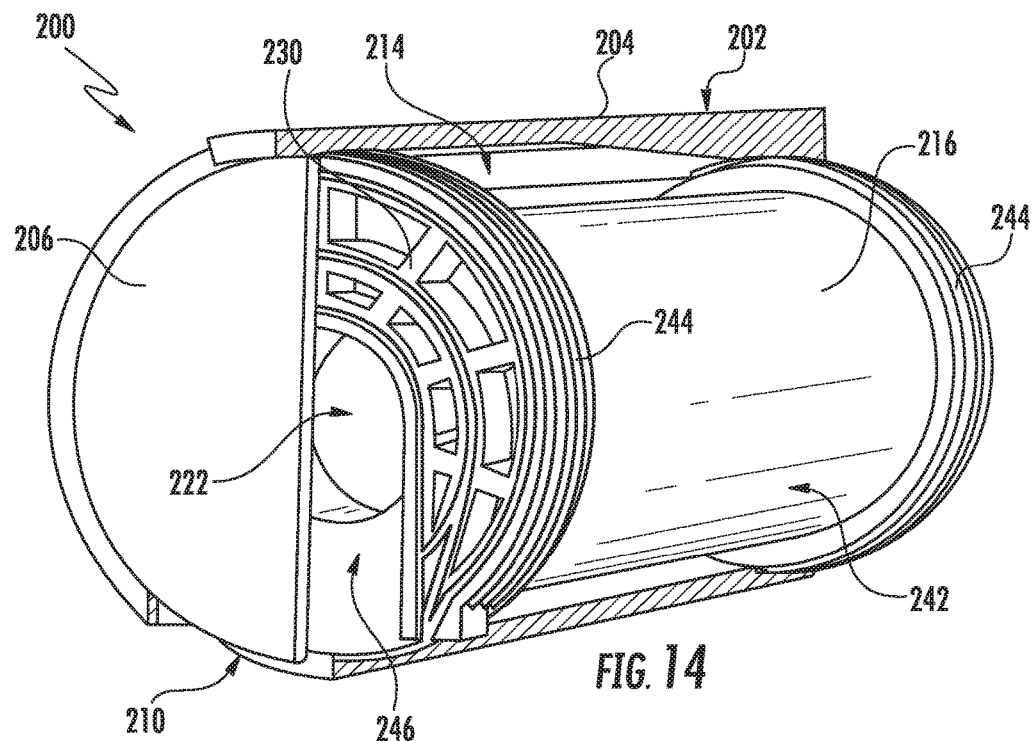
FIG. 14 is a partial perspective view of the exemplary filter of FIG. 13, illustrating a first end cap of the filter.
Figure 17:
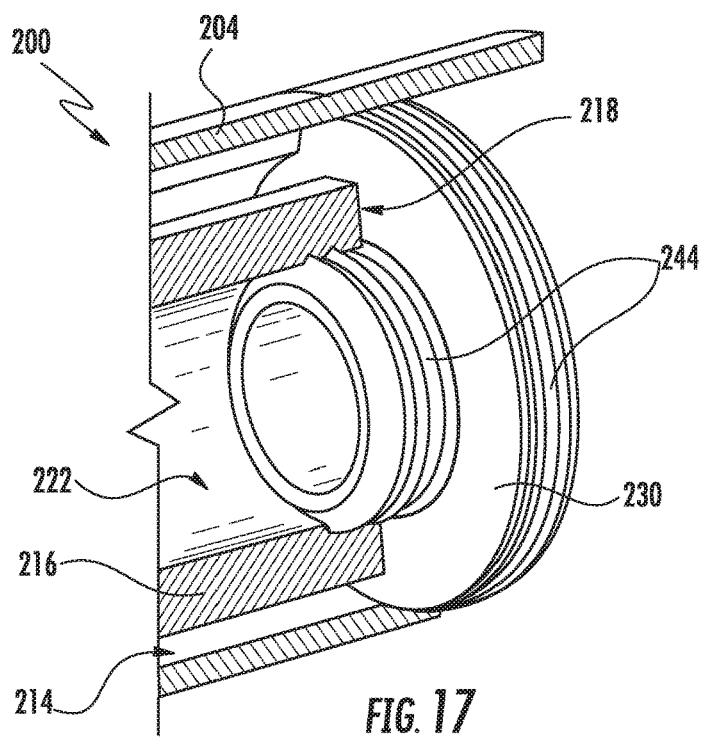
FIG. 17 is a partial perspective view of the exemplary filter of FIG. 13 with the exemplary first end cap of FIG. 16.

As best illustrated in FIGS. 14 and 17, the resilient material of end caps 230, 232 may deform to ensure a sufficient seal with filter medium 216 and housing 202. In order to further improve the seal between these surfaces, end caps 230, 232 may define a plurality of circumferential ridges 244 to further enhance the seal with filter medium 216 and housing 202.

Figure 15:
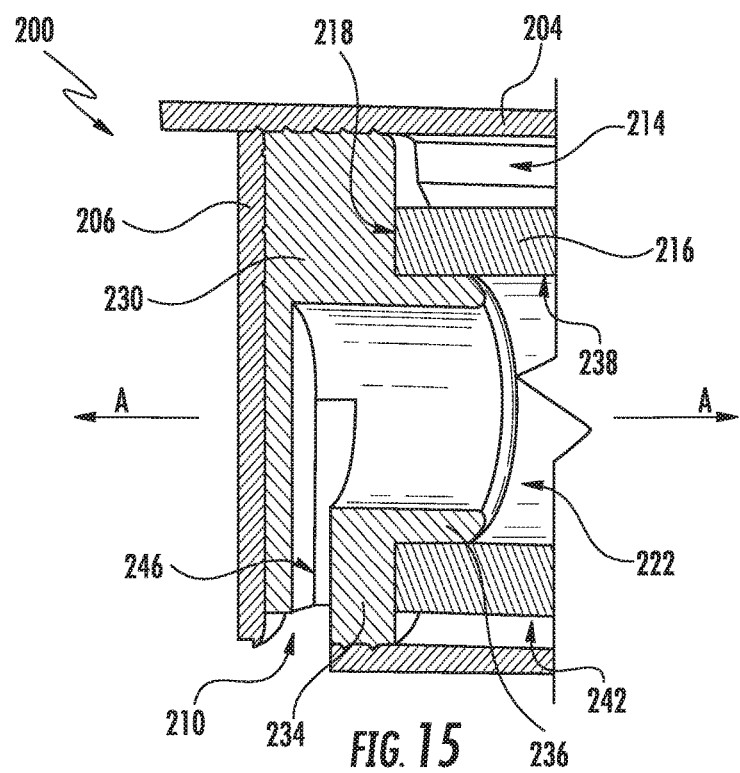
FIG. 15 is a side cross-sectional view of a first end cap of the exemplary filter of FIG. 13 according to an exemplary embodiment of the present disclosure.
Figure 16:
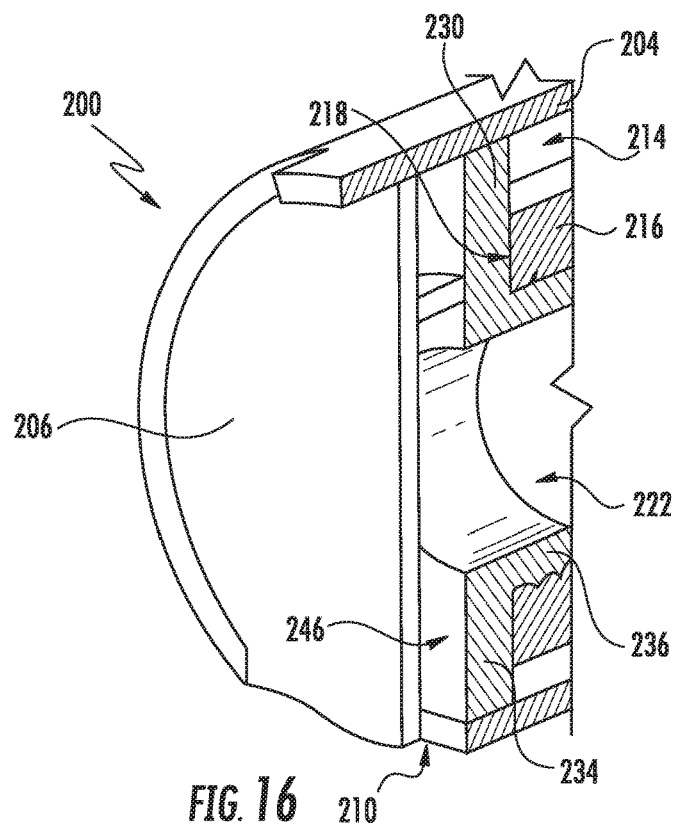
FIG. 16 is a perspective cross-sectional view of a first end cap of the exemplary filter of FIG. 13 according to an exemplary embodiment of the present disclosure.

By forming first end cap 230 and second end cap 232 from a resilient material, e.g., by injection molding, a variety of geometric configurations of end caps 230, 232 may be achieved. In this manner, each end cap 230, 232 may define particular flow channels which serve to improve operation of filter 200. For example, as best shown in FIG. 14, first end wall 206 and first end cap 230 may define an inlet channel 246. Inlet channel 246 is in fluid communication with filter inlet 210 and interior passage 222 of filter medium 216. As shown in FIG. 14 the side walls and the front wall of inlet channel 246 can be formed by first end cap 230, and first end wall 206 can form the back wall of inlet channel 246. According to an alternative embodiment as illustrated in FIG. 15, inlet channel 246 can be formed entirely within first end cap 230, i.e., such that first end cap 230 defines all walls of inlet channel 246. According to still another embodiment shown in FIGS. 16 and 17, first end cap 230 may form only the front wall of inlet channel 246, while first end wall 206 forms the back wall and the side walls. Such constructions may eliminate the need for a hermetic weld between first end wall 206 and sidewall 204 of housing 202. Other configurations of inlet channel 246 are possible and within the scope of the present subject matter. For example, inlet 210 may be defined in first end wall 206 instead of in sidewall 204.

Notably, as shown in FIG. 13, second end cap 232 may serve as a partition wall within filter chamber 214, similar to divider wall 140 of filter 100. By forming second end cap 232 from a resilient material, a suitable fluid seal is formed that may replace the hermetic seal required between divider wall 140 and sidewall 114 in filter 100. Similar to divider wall 140, the fluid seal between sidewall 204 and second end cap 232 prevents unrestricted flow of water from filter chamber 214 to outlet 212. Housing 202 further defines a bypass channel 250 to allow water to flow around second end cap 232. Similar to bypass channel 142, bypass channel 250 is a protruding portion of sidewall 204 that defines a flow aperture 252 above second end cap 232 along the vertical direction V. Filtered water from filter chamber 214 may flow freely through bypass channel 250 and flow aperture 252 to outlet 212. By replacing divider wall 140 with second end cap 232, the required number of plastic parts may be reduced, the molding process may be simplified, and the need for a hermetic weld around divider wall 140 is eliminated.

Figure 18:
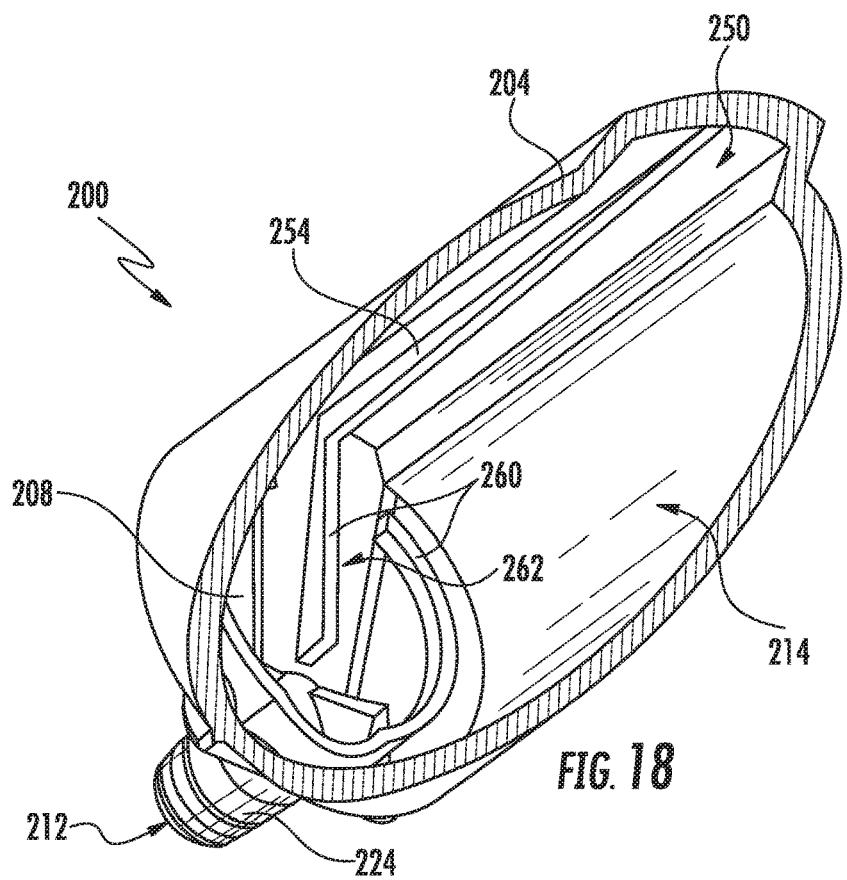
FIG. 18 is a bottom cross-sectional view of a housing of the exemplary filter of FIG. 13.
Figure 19:
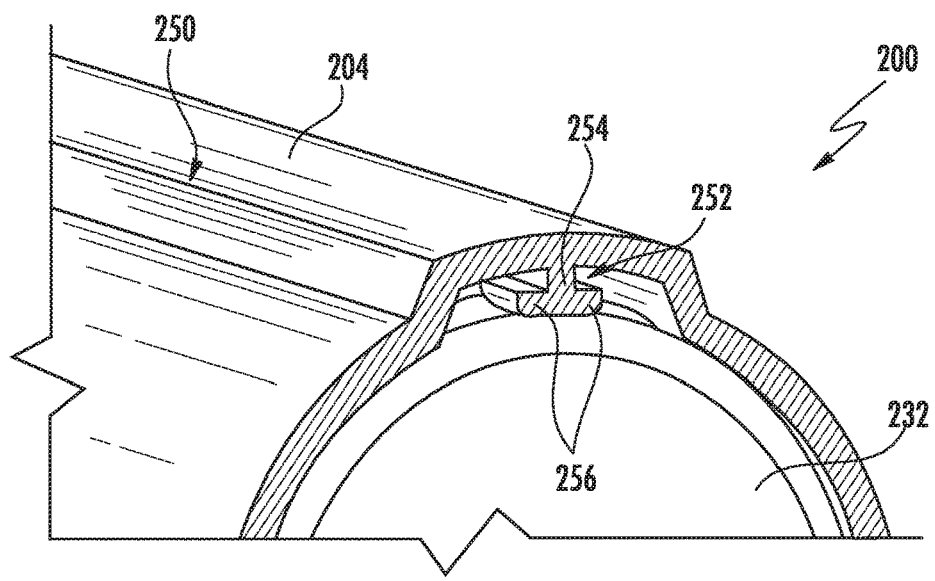
FIG. 19 is a front cross-sectional view of the exemplary filter of FIG. 13.

Notably, because second end cap 232 is constructed from a resilient material, it may have a tendency to expand into and clog bypass channel 250, thereby defeating its functionality. To prevent this, sidewall 204 may further define a clog prevention rib 254. As best illustrated in FIGS. 18 and 19, clog prevention rib 254 is positioned within bypass channel 250 and extends from a center of bypass channel 250 inwardly along the radial direction R toward filter medium 216 and toward second end cap 232. Clog prevention rib 254 also extends along the longitudinal axis A. Clog prevention rib 254 is intended to prevent second end cap 232 from expanding into bypass channel 250 and forming a complete fluid seal with housing 202. The height of clog prevention rib 254, i.e., the distance it extends from bypass channel 250, may vary along its length. According to the illustrated embodiment, the height of clog prevention rib 254 is equivalent to the depth of bypass channel 250. In this regard, clog prevention rib 254 may be tapered such that a bottom surface of clog prevention rib 254 remains parallel to outer surface 242 of filter medium 216.

Referring now to FIG. 19, according to some exemplary embodiments, clog prevention rib 254 may further define clog prevention fins 256 that extend substantially perpendicularly from a distal end of clog prevention rib 254 proximate second end cap 232. For example, clog prevention fins 256 may extend from clog prevention rib 254 in a direction that is substantially parallel to sidewall 204 or second end cap 232. In this manner, clog prevention fins 256 are intended to provide more surface area to prevent second end cap 232 from expanding into bypass channel 250. In this manner, clog prevention fins 256 partially define flow aperture 252 between clog prevention fins 256 and sidewall 204 into which second end cap 232 may not expand, thus always providing a path that is open to fluid flow.

Just as second end cap 232 has a tendency to expand into sidewall 204, second end cap 232 has a tendency to expand into second end wall 208 and clog outlet 212. To prevent this, second end wall 258 may define a standoff rib 260. As best shown in FIG. 18, standoff rib 260 extends from second end wall 208 toward second end cap 232 along the longitudinal axis A to prevent second end cap 232 from forming a fluid seal with second end wall 208 of housing 202. In this manner, standoff rib 260 forms an outlet channel 262 through which water may flow between bypass channel 250 and outlet 212. Standoff rib 260 may be constructed using a variety of geometries and configurations, so long as a fluid flow path such as outlet channel 262 is defined between bypass channel 250 and outlet 212. For example, as illustrated, standoff rib 260 includes one vertically extending member and a partial circumferential member to ensure separation between second end wall 208 and second end cap 232. However, one skilled in the art will appreciate that according to alternative embodiments, standoff rib 260 may take any shape and size sufficient to define a flow path between second end wall 208 and second end cap 232.

When filter 200 is installed in non-plumbed appliance 10, unfiltered water may flow on a particular flow path through filter 200 and filter medium 216 to be filtered before being exhausted through outlet 212. For example, as best shown in FIG. 13, water may flow from storage volume 26 into housing 202 through inlet 210. The unfiltered water then flows into interior passage 222 of filter medium 216 through inlet channel 246. The unfiltered water passes through filter medium 216, where particulates and contaminants are removed before the water flows into filter chamber 214. Notably, second end cap 232 prevents the filtered water from flowing directly from filter chamber 214 to outlet 212. Instead, the filtered water collects until it fills the entire filter chamber 214, then it flows through flow aperture 252 and outlet channel 262 to outlet 212 in a manner similar to that described with respect to filter 100. In this manner, air within housing 202 is purged from filter 200 and the entire filter medium 216 is utilized, thus ensuring improved performance throughout the lifetime of filter 200.

The use of first end cap 230 and second end cap 232 as described herein enhances filter performance, simplifies the design and the assembly of filter 200, and improves reliability. End caps 230, 232 eliminate the need for adhesive to attach and seal filter medium 216. In addition to sealing ends 218, 220 of filter medium 216 without an adhesive, end caps 230, 232 allow sealing of other components of filter 200 and creation of isolated compartments within filter 200. In this manner, end caps 230, 232 ensure proper flow routing though filter 200, replace internal walls, and reduce the overall complexity of the design. Therefore, end caps 230, 232 reduce the number of components, reduce the number and the length of manufacturing steps, eliminate the need for hermetic welds between the components of housing 202, and improve the reliability of filter 200.

Although the description above refers to the use of resilient end caps 230, 232 with filter 200 for a non-plumbed appliance 10, such as a stand-alone ice making appliance, one skilled in the art will appreciate that resilient end caps may be used in filters for other appliances as well. For example, resilient elastomer endcaps may be used with any cylindrical media where water flows radially outward through the filter media, such as is common in non-plumbed appliances. In addition, resilient elastomer end caps may also be used with cylindrical media where water flows radially inward through the filter media, such as is common in refrigerator water filters, under counter water filters, whole house filters, and in any other suitable plumbed or non-plumbed application. As explained briefly above, the end caps may have different geometries to ensure proper sealing engagement between the caps and the filter medium for a particular water flow direction. Other filters and end cap configurations may be used in alternative applications while remaining within the scope of the present subject matter.

Figure 20:
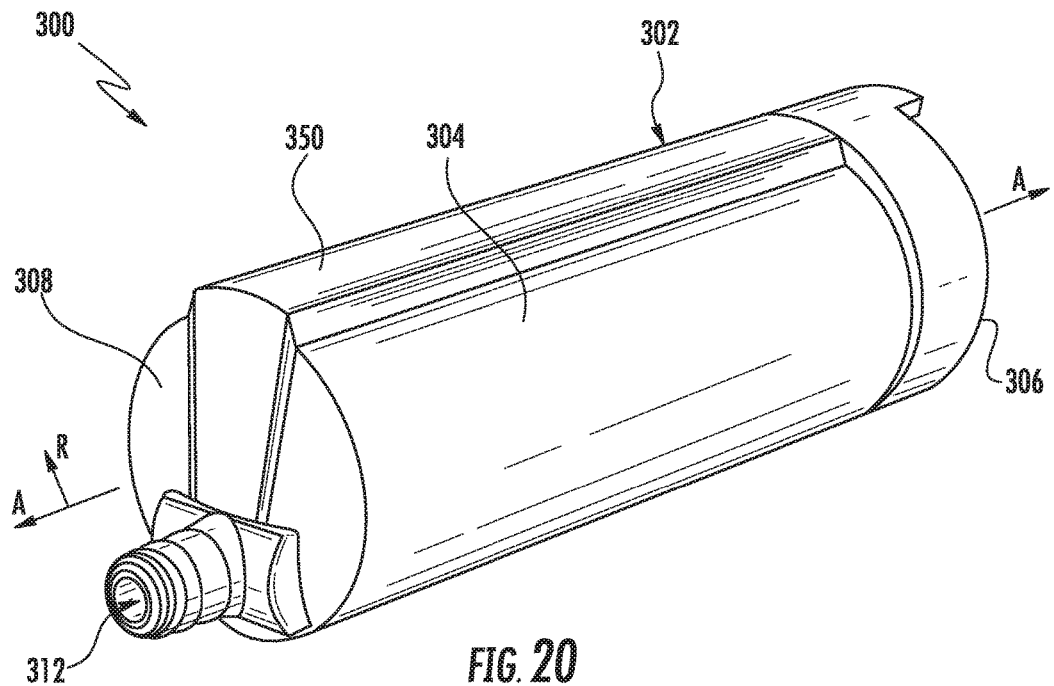
FIG. 20 provides a perspective view of a filter for a non-plumbed appliance in accordance with another embodiment of the present disclosure.
Figure 21:
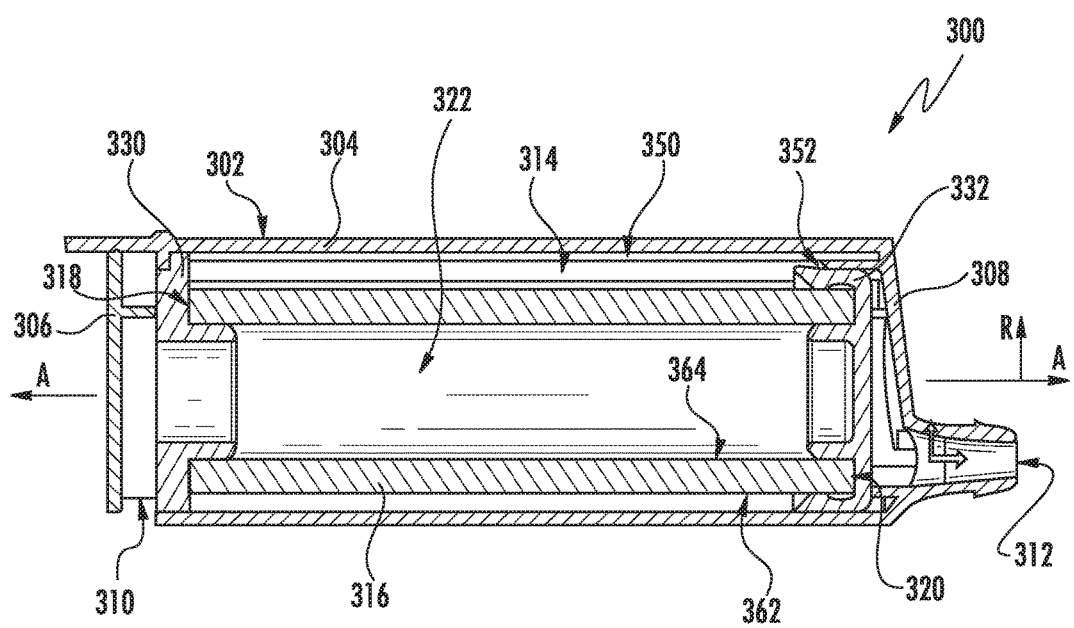
FIG. 21 is a side cross-sectional view of the exemplary filter of FIG. 20.
Figure 22:
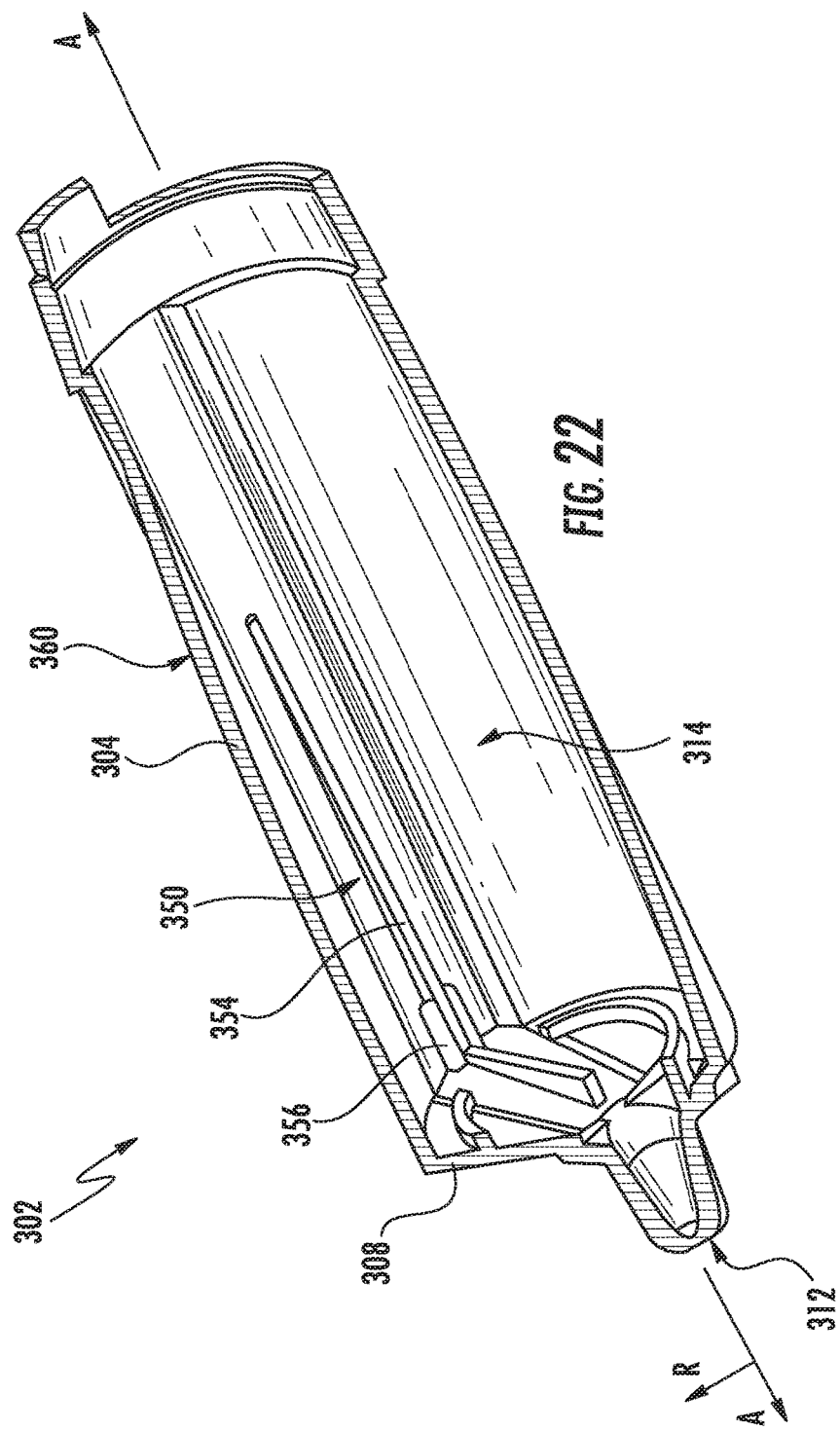
FIG. 22 is a bottom cross-sectional view of a housing of the exemplary filter of FIG. 20.

FIGS. 20 through 22 provide a filter 300 for a non-plumbed appliance according to an exemplary embodiment of the present subject matter. Filter 300 may be used with or in any suitable non-plumbed appliance. For example, filter 300 may be used in non-plumbed appliance 10 (FIG. 1) in place of filter 100. Notably, filter 300 may be similar to filter 200 in most respects, except as described below.

For example, referring to FIGS. 20 and 21, filter 300 may include a housing 302 including a sidewall 304 which extends along the longitudinal axis A between a first end wall 306 and a second end wall 308. Similar to housing 202, housing 302 may define one or more inlets 310 for drawing in unfiltered water and one or more outlets 312 for discharging filtered water. Housing 302 may define a filter chamber 314 for receiving a filter medium 316.

Filter medium 316 may be disposed within filter chamber 314 and may extend along the longitudinal axis A between a first end 318 and a second end 320. Filter medium 316 may be operable to remove contaminants from water flowing through filter medium 316. Further, in exemplary embodiments, filter medium 316 may have a hollow cylindrical shape which defines an interior passage 322. As discussed herein, water may be filtered via a flow path from interior passage 322 through filter medium 316 into filter chamber 314.

According to the illustrated embodiment, a first end cap 330 is positioned at first end 318 of filter medium 316 and a second end cap 332 is positioned at second end 320 of filter medium 316. Similar to end caps 230, 232, first end cap 330 and second end cap 332 may be constructed of any suitably flexible and resilient material. In addition, first end cap 330 and second end cap 332 are configured for forming a fluid seal with filter medium 316 and housing 302, as described above.

Notably, second end cap 332 may serve as a partition wall within filter chamber 314, similar to divider wall 140 of filter 100. By forming second end cap 332 from a resilient material, a suitable fluid seal is formed that may replace the hermetic seal required between divider wall 140 and sidewall 114 in filter 100. Similar to divider wall 140, the fluid seal between sidewall 304 and second end cap 332 prevents unrestricted flow of water from filter chamber 314 to outlet 312. Housing 302 further defines a flow distribution channel 350 to allow water to flow around second end cap 332 in a manner similar to that described above with respect to bypass channel 250.

Similar to bypass channel 142, flow distribution channel 350 is a protruding portion of sidewall 304, i.e., flow distribution channel 350 extends outwardly from sidewall 304 along the radial direction R. Flow distribution channel 350 may define a flow aperture 352 above second end cap 332 along the vertical direction V. In addition, flow distribution channel 350 extends along the entire length of sidewall 304, i.e., between first end wall 306 and second end wall 308 along the longitudinal axis A.

According to the illustrated embodiment, a depth of flow distribution channel 350 is constant along the longitudinal axis A. However, one skilled in the art will appreciate that the depth of flow distribution channel 350 may vary according to alternative embodiments, e.g., to achieve a specific pressure distribution within filter chamber 314.

Notably, because second end cap 332 is constructed from a resilient material, it may have a tendency to expand into and clog flow distribution channel 350 above second end cap 332, thereby defeating its functionality. To prevent this, sidewall 304 may further define a clog prevention rib 354. As best illustrated in FIG. 22, clog prevention rib 354 is positioned within flow distribution channel 350 and extends from a center of flow distribution channel 350 inwardly along the radial direction R toward filter medium 316 and toward second end cap 332. Clog prevention rib 354 also extends along the longitudinal axis A and may be tapered, as described below.

Clog prevention rib 354 is intended to prevent second end cap 332 from expanding into flow distribution channel 350 and forming a complete fluid seal with housing 302. The height of clog prevention rib 354, i.e., the distance it extends from bypass channel 350, may vary along its length. For example, as illustrated in FIG. 22, clog prevention rib 354 is tapered such that a height of clog prevention rib 354 is largest proximate second end cap 332 and decreases as clog prevention rib 354 extends toward first end cap 330. According to an exemplary embodiment, clog prevention rib 354 extends between second end wall 308 and approximately a midpoint 360 of housing 302 along the longitudinal axis A. By tapering clog prevention rib 354, assembly of filter 300 is simplified because second end cap 332 slides easily toward second end wall 308 of housing 302.

Referring still to FIG. 22, according to some exemplary embodiments, clog prevention rib 354 may further define clog prevention fins 356 that extend substantially perpendicularly from a distal end of clog prevention rib 354 proximate second end cap 332. For example, clog prevention fins 356 may extend from clog prevention rib 354 in a direction that is substantially parallel to sidewall 304 or second end cap 332. In this manner, clog prevention fins 356 are intended to provide more surface area to prevent second end cap 332 from expanding into flow distribution channel 350, as described above with respect to filter 200.

When filter 300 is installed in non-plumbed appliance 10, unfiltered water may flow on a particular flow path through filter 300 and filter medium 316 to be filtered before being exhausted through outlet 312. For example, as best shown in FIG. 21, water may flow from storage volume 26 into housing 302 through inlet 310 into interior passage 322 of filter medium 316. The unfiltered water passes through filter medium 316, where particulates and contaminants are removed before the water flows into filter chamber 314. Notably, second end cap 332 prevents the filtered water from flowing directly from filter chamber 314 to outlet 312. Instead, the filtered water collects until it fills the entire filter chamber 314, then it flows through flow aperture 352 to outlet 312 in a manner similar to that described with respect to filter 200. In this manner, air within housing 302 is purged from filter 300 and the entire filter medium 316 is utilized, thus ensuring improved performance throughout the lifetime of filter 300.

Flow distribution channel 350 equalizes the pressure gradient on an outer surface 362 of filter medium 316. The equal pressure gradient results in equal flux through filter medium 316. The equal flux results in equal contact time of the water and filter medium 316 which in turn will improve the efficiency of filter contaminant reduction. In addition, uniform flux ensures that the cumulative mass flow rate is equal at all locations on the surface of filter medium 316 so that the clogging of an interior surface 364 of filter medium 316 is also uniform. Finally, and most importantly, the uniform cumulative mass flow rate through the media will ensure that no location on filter medium 316 will exhaust its contaminant reduction capacity prematurely and the overall filter capacity will be improved. In addition, because flow distribution channel 350 extends along the entire length of sidewall 304, manufacturing is simplified, e.g., due to the simplified profile for injection molding that does not require complicated mold tool actions. Therefore, flow distribution channel 350 is easier to manufacture and improves the water flow pattern through filter medium 316, thereby enhancing contaminant reduction performance, improving clogging resistance, and increasing filter capacity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A non-plumbed appliance defining a vertical direction, a lateral direction, and a transverse direction, the non-plumbed appliance comprising:
   a water tank defining a storage volume;
   a pump in fluid communication with the storage volume for actively flowing water from the water tank; and a filter disposed within the storage volume such that the water is flowable from the storage volume through the filter to the pump, the filter comprising:
  a filter housing comprising a sidewall extending along a longitudinal axis between a first end wall and a second end wall, the filter housing defining a filter chamber;
  a filter medium positioned within the filter chamber, the filter medium defining a first end, a second end separated from the first end along the longitudinal axis, and an interior passage, the filter medium being operable to remove contaminants from the water flowing through the filter medium;
  a filter inlet defined proximate the first end of the filter medium and the first end wall of the filter housing;
  a filter outlet positioned proximate the second end of the filter medium and the second end wall of the filter housing;
  a first end cap positioned at the first end of the filter medium and forming a fluid seal with the filter medium and the filter housing, the first end cap defining an inlet channel in fluid communication with the interior passage of the filter medium;
  a second end cap positioned at the second end of the filter medium and forming a second fluid seal with the filter medium and the sidewall of the filter housing, wherein the water flows through the inlet channel, into the interior passage, outward along a radial direction into the filter chamber, and around the second end cap to the filter outlet; and
  a standoff rib defined on the second end wall of the filter housing and extending toward the second end cap along the longitudinal axis to prevent the second end cap from forming a fluid seal with the second end wall of the filter housing, wherein at least a portion of the standoff rib extends along the radial direction.

2. The non-plumbed appliance of claim 1, wherein the inlet channel is defined between the first end wall and the first end cap, the inlet channel being in fluid communication with the filter inlet and the interior passage of the filter medium.

3. The non-plumbed appliance of claim 2, wherein the filter inlet is positioned at a bottom portion of the filter housing along the vertical direction, and wherein the longitudinal axis is perpendicular to the vertical direction.

4. The non-plumbed appliance of claim 1, wherein the inlet channel is formed entirely within the first end cap and turns outward along the radial direction.

5. The non-plumbed appliance of claim 1, wherein the first end cap and the second end cap each define a sealing flange, the sealing flange extending into the interior passage of the filter medium along the longitudinal axis to form a fluid seal with an interior surface of the filter medium.

6. The non-plumbed appliance of claim 1, wherein the fluid seal between the second end cap and the filter housing prevents the water flowing from the filter chamber to the filter outlet, and wherein a bypass channel formed by the sidewall at a top portion of the sidewall along the vertical direction through which the water may flow from the filter chamber around the second end cap to the filter outlet.

7. The non-plumbed appliance of claim 6, wherein the sidewall of the filter housing forms a clog prevention rib that extends inward along the radial direction and along the longitudinal axis to prevent the second end cap from expanding into the bypass channel along the radial direction and forming a complete fluid seal with the filter housing.

8. The non-plumbed appliance of claim 7, wherein the sidewall of the filter housing further defines clog prevention fins that extend substantially perpendicularly from a distal end of the clog prevention rib proximate the second end cap.

9. The non-plumbed appliance of claim 6, wherein the bypass channel is tapered such that a depth of the bypass channel is largest proximate the second end cap and decreases as the bypass channel extends toward the first end cap.

10. The non-plumbed appliance of claim 1, wherein the first end cap and the second end cap are constructed from a resilient material.

11. The non-plumbed appliance of claim 10, wherein the resilient material comprises at least one of molded silicone and a thermoplastic elastomer.

12. The non-plumbed appliance of claim 1, wherein a nozzle protrudes from the second end wall along the longitudinal axis and defines the filter outlet, the nozzle extending into a female fitting of the water tank when the filter is installed in the non-plumbed appliance.

13. The non-plumbed appliance of claim 7, wherein the standoff rib is in direct contact with and extends from the clog prevention rib.

14. A filter comprising:
  a filter housing comprising a sidewall extending along a longitudinal axis between a first end wall and a second end wall, the filter housing defining a filter chamber;
  a filter medium positioned within the filter chamber, the filter medium defining a first end, a second end separated from the first end along the longitudinal axis, and an interior passage, the filter medium being operable to remove contaminants from water flowing through the filter medium;
  a filter inlet defined proximate the first end of the filter medium and the first end wall of the filter housing;
  a filter outlet positioned proximate the second end of the filter medium and the second end wall of the filter housing;
  a first end cap positioned at the first end of the filter medium and forming a fluid seal with the filter medium and the filter housing, the first end cap defining an inlet channel in fluid communication with the interior passage of the filter medium;
  a second end cap positioned at the second end of the filter medium and forming a second fluid seal with the filter medium and the filter housing to prevent the water flowing from the filter chamber to the filter outlet;
  a bypass channel defined by the sidewall proximate the second end cap, the bypass channel enabling the water to flow from the filter chamber around the second end cap to the filter outlet, wherein the water flows through the inlet channel, into the interior passage, outward along a radial direction into the filter chamber, and through the bypass channel to the filter outlet; and
  a standoff rib defined on the second end wall of the filter housing and extending toward the second end cap along the longitudinal axis to prevent the second end cap from forming a fluid seal with the second end wall of the filter housing, wherein at least a portion of the standoff rib extends along the radial direction.

15. The filter of claim 14, wherein the inlet channel is defined between the first end wall and the first end cap, the inlet channel being in fluid communication with the filter inlet and the interior passage of the filter medium.

16. The filter of claim 14, wherein the inlet channel is formed entirely within the first end cap and turns outward along the radial direction.

17. The filter of claim 14, wherein the first end cap and the second end cap each define a sealing flange, the sealing flange extending into the interior passage of the filter medium along the longitudinal axis to form a fluid seal with an interior surface of the filter medium.

18. The filter of claim 14, wherein the sidewall of the filter housing forms a clog prevention rib that extends inward along the radial direction and along the longitudinal axis through to prevent the second end cap from expanding into the bypass channel along the radial direction and forming a complete fluid seal with the filter housing.

19. The filter of claim 14, wherein the first end cap and the second end cap are constructed from a resilient material.

20. The filter of claim 18, wherein the standoff rib is in direct contact with and extends from the clog prevention rib.

\* \* \* \* \*